United States Patent
Cho et al.

(10) Patent No.: US 12,001,244 B2
(45) Date of Patent: Jun. 4, 2024

(54) METHOD FOR MEASURING ILLUMINANCE, AND ELECTRONIC DEVICE THEREFOR

(71) Applicant: Samsung Electronics Co., Ltd., Suwon-si (KR)

(72) Inventors: Jeongho Cho, Suwon-si (KR); Kyusung Kim, Suwon-si (KR); Jongah Kim, Suwon-si (KR); Jeongmin Park, Suwon-si (KR); Heewoong Yoon, Suwon-si (KR); Donghan Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/847,790

(22) Filed: Jun. 23, 2022

(65) Prior Publication Data

US 2022/0326734 A1 Oct. 13, 2022

Related U.S. Application Data

(63) Continuation of application No. PCT/KR2020/015889, filed on Nov. 12, 2020.

(30) Foreign Application Priority Data

Dec. 27, 2019 (KR) .................. 10-2019-0176891

(51) Int. Cl.
*G06F 1/16* (2006.01)
*G09G 5/10* (2006.01)

(52) U.S. Cl.
CPC .......... *G06F 1/1641* (2013.01); *G06F 1/1677* (2013.01); *G09G 5/10* (2013.01);
(Continued)

(58) Field of Classification Search
CPC ...... G06F 3/041–047; G06F 2203/041–04114; G06F 1/1652;
(Continued)

(56) References Cited

U.S. PATENT DOCUMENTS 9,747,868 B2 8/2017 Lee et al.
10,235,119 B2 3/2019 Choi et al.
(Continued)

FOREIGN PATENT DOCUMENTS

JP 2004-012643 A 1/2004
JP 2013-007827 A 1/2013
(Continued)

OTHER PUBLICATIONS

Korean Office Action dated Apr. 16, 2024, issued in Korean Application No. 10-2019-0176891.

*Primary Examiner* — Sanjiv D. Patel
(74) *Attorney, Agent, or Firm* — Jefferson IP Law, LLP

(57) ABSTRACT

A foldable electronic device is provided. The foldable electronic device includes a foldable housing that can be fold/unfolded with respect to a folding shaft, a display that is visible through one surface of the foldable housing, a photosensor which is arranged inside the foldable housing and which includes a light-receiving unit for measuring the intensity of light emitted at the electronic device, and at least one processor operationally connected to the photosensor and the display, wherein the at least one processor is configured to acquire an illuminance value by using the photosensor, acquire data related to the incident angle of the light, emitted on the electronic device, by using the photosensor, correct the illuminance value based on the data related to the incident angle of the light, determine the brightness of a first part of the display based on the corrected illuminance value, and determine the brightness of a second (Continued)

part of the display based on the illuminance value and the angle formed by the foldable housing.

20 Claims, 13 Drawing Sheets

(52) U.S. Cl.
 CPC ............... *G09G 2320/0626* (2013.01); *G09G 2360/144* (2013.01)

(58) Field of Classification Search
 CPC ....... G06F 1/1616–1618; G06F 1/1641; G06F 1/1681; G06F 1/1677; G09F 9/301; G09F 9/335; G09F 9/35; G09G 2380/02; G09G 3/035; G09G 2360/144; G09G 2320/0626; G09G 5/10; H10K 59/65; H10K 59/40
 See application file for complete search history.

(56) References Cited

U.S. PATENT DOCUMENTS

| | | |
|---|---|---|
| 11,125,610 B2 | 9/2021 | Yoon et al. |
| 11,238,831 B2 | 2/2022 | Kwon |
| 2002/0180750 A1 | 12/2002 | Rozzi |
| 2010/0096997 A1 | 4/2010 | Ahn et al. |
| 2010/0253616 A1 | 10/2010 | Omi et al. |
| 2012/0019493 A1* | 1/2012 | Barnhoefer ........ H05B 41/3922 345/207 |
| 2012/0147068 A1 | 6/2012 | Gondo |
| 2014/0118319 A1* | 5/2014 | Jeon .......................... G06F 1/00 345/207 |
| 2017/0206049 A1 | 7/2017 | Choi et al. |
| 2018/0005588 A1* | 1/2018 | Kurokawa ............. B60K 35/00 |
| 2018/0063435 A1 | 3/2018 | Cho et al. |
| 2019/0371225 A1 | 12/2019 | Aurongzeb et al. |

FOREIGN PATENT DOCUMENTS

| | | | |
|---|---|---|---|
| JP | 2013007827 A | * | 1/2013 |
| JP | 5305387 B2 | | 10/2013 |
| KR | 10-0689458 B1 | | 3/2007 |
| KR | 10-0981970 B1 | | 9/2010 |
| KR | 10-2014-0064157 A | | 5/2014 |
| KR | 10-2014-0147253 A | | 12/2014 |
| KR | 10-2017-0085317 A | | 7/2017 |
| KR | 10-2018-0024299 A | | 3/2018 |
| KR | 10-2018-0131848 A | | 12/2018 |
| KR | 10-2019-0113121 A | | 10/2019 |
| KR | 10-2037733 B1 | | 10/2019 |

* cited by examiner

METHOD FOR MEASURING ILLUMINANCE, AND ELECTRONIC DEVICE THEREFOR

CROSS-REFERENCE TO RELATED APPLICATION(S)

This application is a continuation application, claiming priority under § 365(c), of an International application No. PCT/KR2020/015889, filed on Nov. 12, 2020, which is based on and claims the benefit of a Korean patent application number 10-2019-0176891, filed on Dec. 27, 2019, in the Korean Intellectual Property Office, the disclosure of which is incorporated by reference herein in its entirety.

BACKGROUND

1. Field

The disclosure relates to measuring illuminance in an electronic device. More particularly, the disclosure relates to an electronic device which is capable of appropriately adjusting brightness of a display by correcting an illuminance value acquired by a photosensor, by considering an incident angle of light emitted to the electronic device.

2. Description of Related Art

As performance of portable electronic devices, such as smartphones has gradually advanced, various services are provided through electronic devices. Specifically, besides basic services like calling, texting, etc., the service domain is expanding to complex services, such as playing games, messengers, editing documents, replaying and editing images/videos.

As various services are provided through electronic devices, various functions are required in addition to simple input and output of data and processing. For example, a sensing function using various sensors may be required. Specifically, a sensor using light may be used. The sensor using light may include, for example, a camera, an ultraviolet (UV) sensor, an iris sensor, a spectrum sensor, a proximity/gesture sensor using infrared ray (IR), a red-green-blue (RGB) sensor, an illuminance sensor, or the like.

An electronic device may acquire ambient illuminance of the electronic device through a photosensor. The electronic device may adjust brightness of a display, based on the illuminance acquired through the photosensor. The electronic device may reduce brightness of the display in a dark place to reduce user's eye fatigue, or may increase brightness of the display in a bright place to make contents displayed on the display clearly visible to a user.

The above information is presented as background information only to assist with an understanding of the disclosure. No determination has been made, and no assertion is made, as to whether any of the above might be applicable as prior art with regard to the disclosure.

SUMMARY

When side light is emitted to an electronic device, a light receiver of a photosensor may have an area that part of the side light does not reach due to a housing of the photosensor or a printed area of a front surface cover since the light receiver of the photosensor has a limited size. As a result, illuminance measured through the photosensor may be different from real illuminance. When display brightness is automatically adjusted, brightness of the display may be changed to be inappropriate to a surrounding environment, thereby causing user's eyes fatigue.

Aspects of the disclosure are to address at least the above-mentioned problems and/or disadvantages and to provide at least the advantages described below. Accordingly, an aspect of the disclosure is to provide an electronic device which is capable of appropriately adjusting brightness of a display by correcting an illuminance value acquired by a photosensor, by considering an incident angle of light emitted to the electronic device. In addition, there may be provided a means for appropriately adjusting brightness of a display of all areas in a foldable electronic device.

Additional aspects will be set forth in part in the description which follows and, in part, will be apparent from the description, or may be learned by practice of the presented embodiments.

In accordance with an aspect of the disclosure, a foldable electronic device is provided. The foldable electronic device includes a foldable housing including a hinge structure, a first housing structure connected to the hinge structure and including a first surface and a second surface facing the first surface, and a second housing structure connected to the hinge structure and including a third surface and a fourth surface facing the third surface, the second housing structure forming an angle of an allowed range with the first housing structure through the hinge structure, a display including a first portion which is viewable through the first surface, and a second portion which is viewable through the third surface and is connected with the first portion, a photosensor disposed inside the foldable housing and including a light receiver configured to measure an intensity of light shining on the electronic device, and at least one processor operatively connected with the photosensor and the display, and the at least one processor is configured to acquire an illuminance value by using the photosensor, acquire data related to an incident angle of the light emitted to the electronic device by using the photosensor, correct the illuminance value based on the data related to the incident angle of the light, determine a brightness of the first portion, based on the corrected illuminance value, and determine a brightness of the second portion, based on the illuminance value and an angle formed by the first housing and the second housing.

In accordance with another aspect of the disclosure, a control method of a foldable electronic device is provided. The control method includes a first housing including a first surface and a second surface facing the first surface, a second housing which is foldable with respect to the first housing and includes a third surface and a fourth surface facing the third surface, a display exposed through the first surface and the third surface, and a photosensor disposed within the first housing and including a light receiver configured to measure an intensity of light emitting through the first surface, the control method including acquiring an illuminance value by using the photosensor, acquiring data related to an incident angle of light emitted to the photosensor by using the photosensor, correcting the illuminance value based on the data related to the incident angle of the light, determining a brightness of a first portion of the display exposed through the first surface of the first housing, based on the corrected illuminance value, and determining a brightness of a second portion exposed through the third surface in the display, based on the illuminance value and an angle formed by the first housing and the second housing.

In accordance with another aspect of the disclosure, an electronic device is provided. The electronic device includes a housing including a front surface, a rear surface facing the front surface, and a side surface enclosing a space between the front surface and the rear surface, a display which is viewable through part of the front surface of the housing, a photosensor which is disposed inside the housing and includes a plurality of photodiodes, and is configured to measure an intensity of light shining on the front surface of the housing, and at least one processor electrically connected with the photosensor and the display, and the at least one processor is configured to acquire an illuminance value by using the photosensor, to acquire first data from a first subset including at least one photodiode among the plurality of photodiodes, and to acquire second data from a second subset including at least one photodiode different from the first subset among the plurality of photodiodes, while the photosensor is activated, to correct the illuminance value based on the first data and the second data, and to determine a brightness of the display, based on the corrected illuminance value.

According to embodiments of the disclosure, an electronic device may acquire exact illuminance, based on an illuminance value acquired through a photosensor and an incident angle of light shining on the photosensor. The electronic device may appropriately adjust brightness of a display, based on the exact illuminance acquired through the photosensor, thereby reducing user's fatigue.

According to embodiments of the disclosure, a foldable electronic device may appropriately adjust brightness of all areas of a display including areas which face in different directions according to folding of the electronic device, by considering an incident angle of light emitted to the electronic device and a folding angle of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
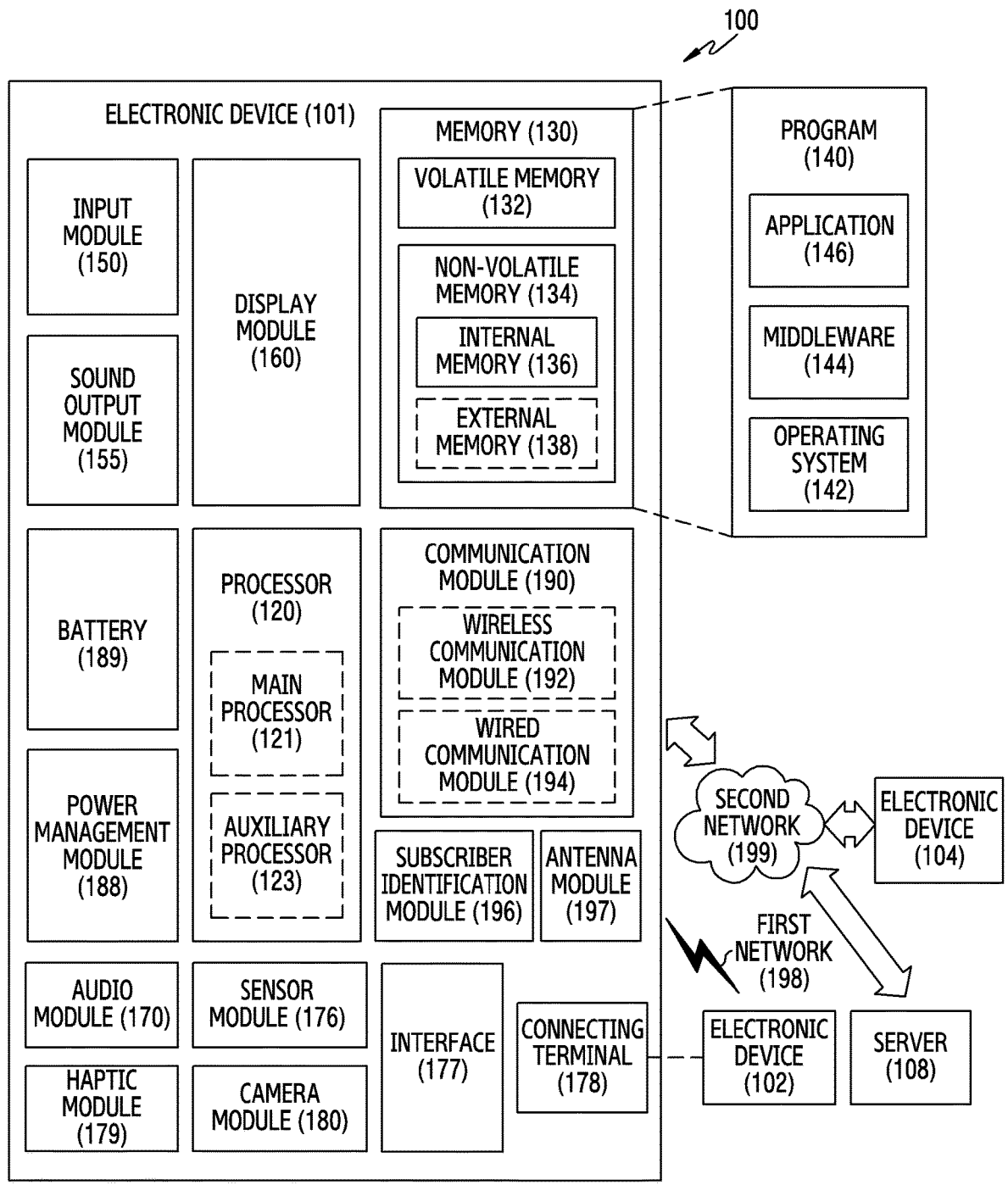
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2A:
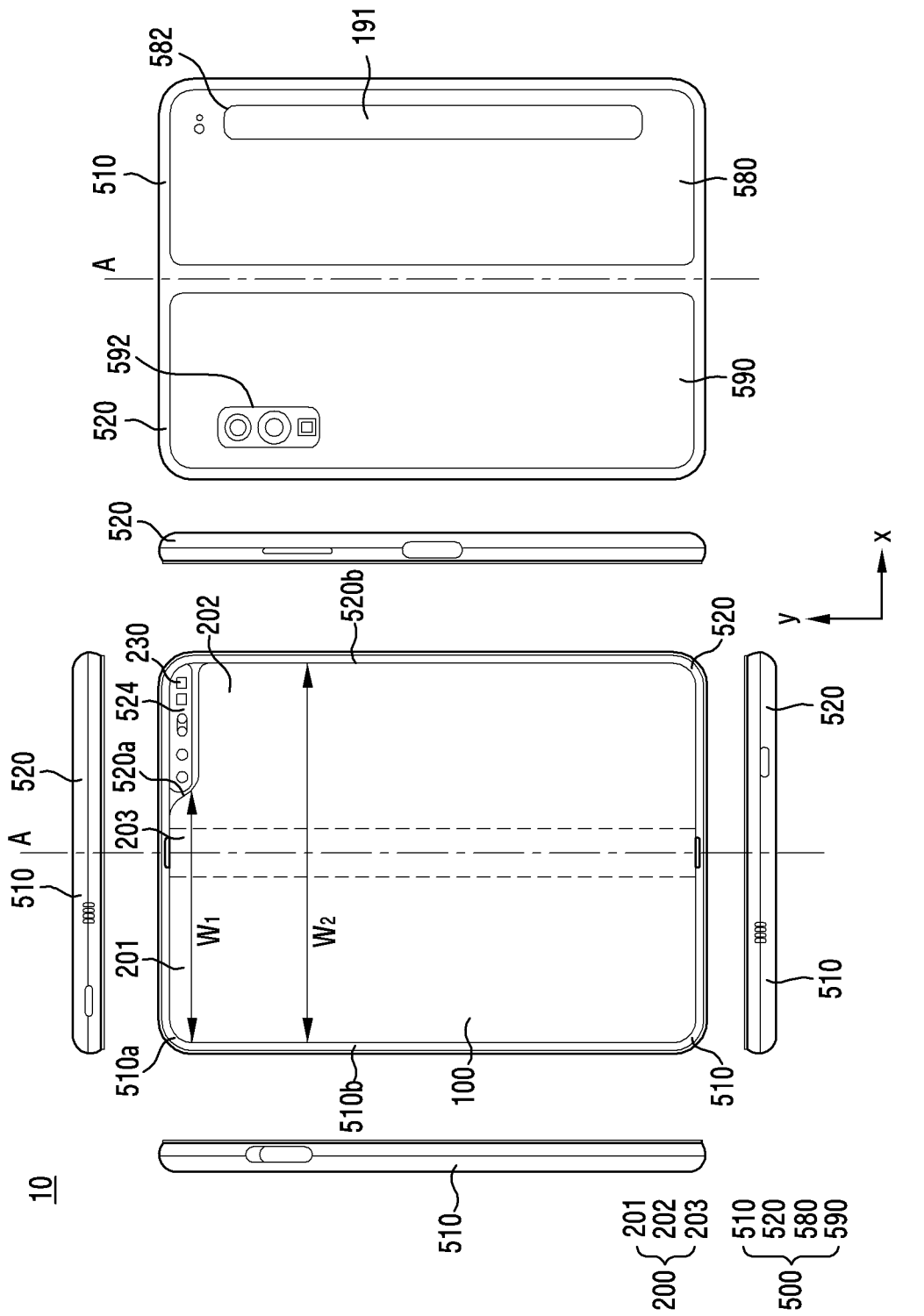
FIG. 2A is a view illustrating a flat state of an electronic device according to an embodiment of the disclosure.

FIG. 2A is a view illustrating a flat state of a foldable electronic device according to an embodiment of the disclosure.

Figure 2B:
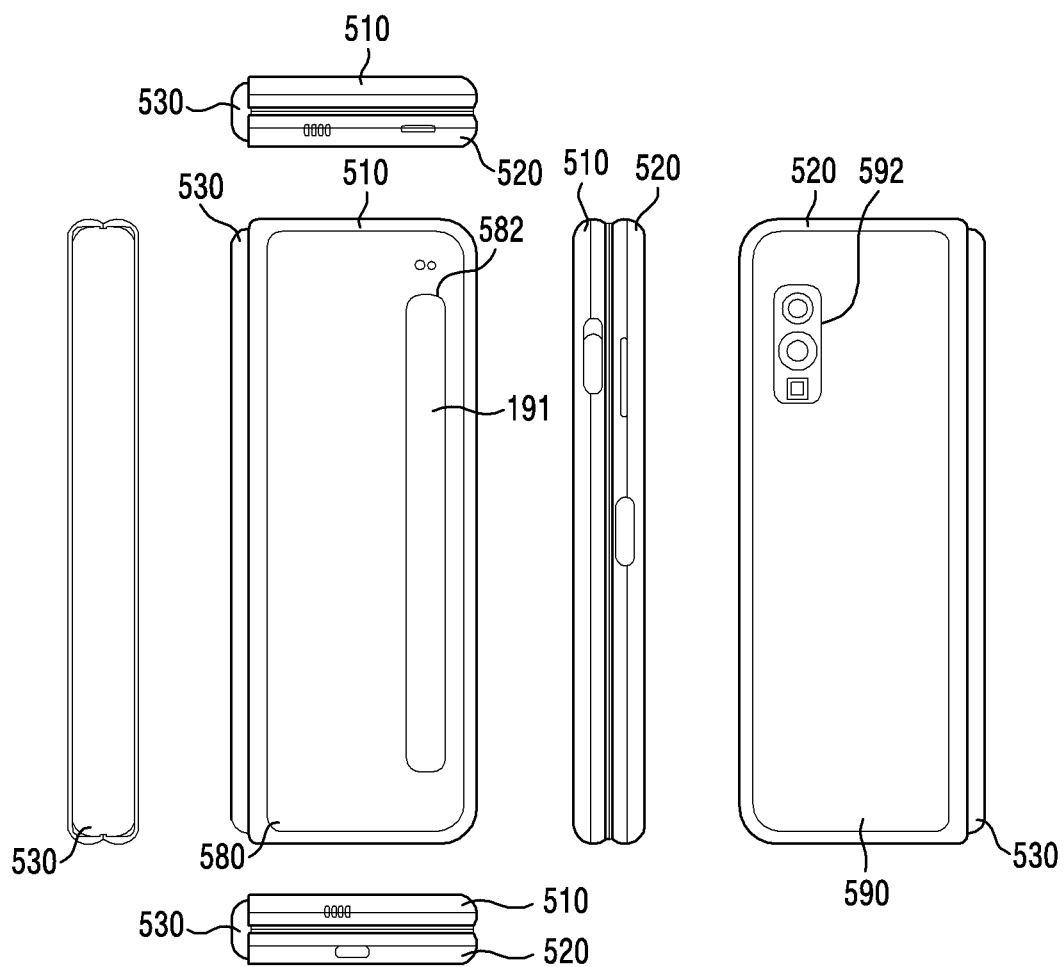
FIG. 2B is a view illustrating a folded state of an electronic device according to an embodiment of the disclosure.

FIG. 2B is a view illustrating a folded state of an electronic device according to an embodiment of the disclosure.

Referring to FIGS. 2A and 2B, in an embodiment of the disclosure, the electronic device 10 may include a foldable housing 500, a hinge cover 530 to cover a foldable portion of the foldable housing, and a flexible or foldable display 200 (hereinafter, referred to as a "display" 200) disposed in a space formed by the foldable housing 500. In an embodiment the disclosure, a surface on which the display 200 is disposed is defined as a first surface or a front surface of the electronic device 10. In addition, the opposite surface of the front surface is defined as a second surface or a rear surface of the electronic device 10. In addition, a surface surrounding a space between the front surface and the rear surface is defined as a third surface or a side surface of the electronic device 10.

In an embodiment of the disclosure, the foldable housing 500 may include a first housing structure 510, a second housing structure 520 including a sensor area 524, a first rear surface cover 580, and a second rear surface cover 590. The foldable housing 500 of the electronic device 10 is not limited to the shape and coupling illustrated in FIGS. 2A and 2B, and may be implemented by a combination and/or coupling of other shapes or components. For example, in another embodiment of the disclosure, the first housing structure 510 and the first rear surface cover 580 may be integrally formed with each other, and the second housing structure 520 and the second rear surface cover 590 may be integrally formed with each other.

In the illustrated embodiment of the disclosure, the first housing structure 510 and the second housing structure 520 may be disposed on both sides with reference to a folding axis (A axis), and may have a substantially symmetrical shape with respect to the folding axis A. As will be described below, the first housing structure 510 and the second housing structure 520 may have an angle or a distance therebetween that is changed according to whether the electronic device 10 is in a flat state, a folded state, or an intermediate state. In the illustrated embodiment of the disclosure, the second housing structure 520 additionally includes the sensor area 524 where various sensors are disposed, differently from the first housing structure 510, but may have a symmetrical shape on the other area.

Referring to FIG. 2A, the first housing structure 510 and the second housing structure 520 may form a recess to accommodate the display 200 all together. In the illustrated embodiment of the disclosure, the recess may have two or more different widths in a direction perpendicular to the folding axis A due to the sensor area 524.

For example, the recess may have (1) a first width w1 between a first portion 510a of the first housing structure 510 that is parallel to the folding axis A, and a first portion 520a of the second housing structure 520 that is formed on an edge of the sensor area 524, and (2) a second width w2 formed by a second portion 510b of the first housing structure 510 and a second portion 520b of the second housing structure 520 that does not correspond to the sensor area 524 and is parallel to the folding axis A. In this case, the second width w2 may be longer than the first width w1. In other words, the first portion 510a of the first housing structure 510 and the first portion 520a of the second housing structure 520, which have an asymmetrical shape, may form the first width w1 of the recess, and the second portion 510b of the first housing structure 510 and the second portion 520b of the second housing structure 520, which have a symmetrical shape, may form the second width w2 of the recess. In an embodiment of the disclosure, the first portion 520a and the second portion 520b of the second housing structure 520 may have different distances from the folding axis A. The width of the recess is not limited to the illustrated example. In various embodiments of the disclosure, the recess may have a plurality of widths according to a shape of the sensor area 524 or portions of the first housing structure 510 and the second housing structure 520 that have an asymmetrical shape.

In an embodiment of the disclosure, at least part of the first housing structure 510 and the second housing structure 520 may be formed with a metallic material or a nonmetallic material having stiffness of a size selected to support the display 200.

In an embodiment of the disclosure, the sensor area 524 may be formed to have a predetermined area adjacent to one corner of the second housing structure 520. However, the disposal, shape, and size of the sensor area 524 are not limited to the illustrated example. For example, in another embodiment of the disclosure, the sensor area 524 may be provided on another corner of the second housing structure 520 or a certain area between an upper end corner and a lower end corner. In an embodiment of the disclosure, components which are embedded in the electronic device 10 to perform various functions may be exposed to the front surface of the electronic device 10 through the sensor area 524 or one or more openings provided on the sensor area 524. In various embodiments of the disclosure, the components may include various types of sensors. The sensors may include, for example, at least one of a front-facing camera, a receiver, or a proximity sensor.

The first rear surface cover 580 may be disposed on one side of the folding axis on the rear surface of the electronic device, and for example, may have a substantially rectangular periphery and may have the periphery surrounded by the first housing structure 510 Similarly, the second rear surface cover 590 may be disposed on the other side of the folding axis on the rear surface of the electronic device, and may have the periphery surrounded by the second housing structure 520.

In the illustrated embodiment of the disclosure, the first rear surface cover 580 and the second rear surface cover 590 may have a substantially symmetrical shape with reference to the folding axis (A axis). However, the first rear surface cover 580 and the second rear surface cover 590 may not necessarily have the symmetrical shape, and in another embodiment of the disclosure, the electronic device 10 may include the first rear surface cover 580 and the second rear surface cover 590 of various shapes. In still another embodiment of the disclosure, the first rear surface cover 580 may be integrally formed with the first housing structure 510, and the second rear surface cover 590 may be integrally formed with the second housing structure 520.

In an embodiment of the disclosure, the first rear surface cover 580, the second rear surface cover 590, the first housing structure 510, and the second housing structure 520 may form a space to have various components (for example, a printed circuit board or a battery) of the electronic device 10 disposed therein. In an embodiment of the disclosure, one or more components may be disposed on the rear surface of the electronic device 10 or may be visually exposed. For example, at least part of a sub display 191 may be visually exposed through a first rear surface area 582 of the first rear surface cover 580. In another embodiment of the disclosure, one or more components or a sensor may be visually exposed through a second rear surface area 592 of the second rear surface cover 590. In various embodiments of the disclosure, the sensor may include a proximity sensor and/or a rear-facing camera.

Referring to FIG. 2B, the hinge cover 530 may be disposed between the first housing structure 510 and the second housing structure 520, and may be configured to hide inner components (for example, a hinge structure). In an embodiment of the disclosure, the hinge cover 530 may be hidden by a portion of the first housing structure 510 and the second housing structure 520, or may be exposed to the outside, according to a state (a flat state or a folded state) of the electronic device 10.

For example, when the electronic device 10 is in the flat state as shown in FIG. 2A, the hinge cover 530 may be hidden by the first housing structure 510 and the second housing structure 520 and may not be exposed. For example, when the electronic device 10 is in the folded state (for example, a fully folded state) as shown in FIG. 2B, the hinge cover 530 may be exposed to the outside between the first housing structure 510 and the second housing structure 520. For example, in an intermediate state in which the first housing structure 510 and the second housing structure 520 are folded with a certain angle, the hinge cover 530 may be exposed to the outside in part between the first housing structure 510 and the second housing structure 520. However, in this case, the exposed area may be smaller than in the fully folded state. In an embodiment of the disclosure, the hinge cover 530 may include a curved surface.

The display 200 may be disposed on the space formed by the foldable housing 500. For example, the display 200 may be seated on the recess formed by the foldable housing 500, and may form most of the front surface of the electronic device 10.

Accordingly, the front surface of the electronic device 10 may include the display 200, and some areas of the first housing structure 510 adjacent to the display 200 and some areas of the second housing structure 520. In addition, the rear surface of the electronic device 10 may include the first rear surface cover 580, some areas of the first housing structure 510 that are adjacent to the first rear surface cover 580, the second rear surface cover 590, and some areas of the second housing structure 520 that are adjacent to the second rear surface cover 590.

The display 200 may refer to a display that has at least some areas deformable to a flat surface or a curved surface. In an embodiment of the disclosure, the display 200 may include a folding area 203, a first area 201 disposed on one side (the left of the folding area 203 show in FIG. 2A) with reference to the folding area 203, and a second area 202 disposed on the other side (the right of the folding area 203 shown in FIG. 2A).

The divided areas of the display 200 shown in FIG. 2A are examples and the display 200 may be divided into a plurality of areas (for example, four or more areas or two areas) according to a structure or a function of the display 200. For example, in the embodiment illustrated in 2A, the display 200 may be divided into areas by the folding area 203 extended in parallel with the y-axis or the folding axis (A axis), but in another embodiment of the disclosure, the display 200 may be divided into areas with reference to another folding area (for example, a folding area parallel to the x-axis) or another folding axis (for example, a folding axis parallel to the x-axis).

The first area 201 and the second area 202 may have a substantially symmetrical shape with reference to the folding area 203. However, the second area 202 may include a notch that is cut according to the presence of the sensor area 524, differently from the first area 201, but may have a symmetrical shape with the first area 201 on the other area. In other words, the first area 201 and the second area 202 may include portions that have a symmetrical shape and portions that have an asymmetrical shape.

Hereinafter, operations of the first housing structure 510 and the second housing structure 520 and respective areas of the display 200 according to a state (for example, a flat state or a folded state) of the electronic device 10 will be described.

In an embodiment of the disclosure, when the electronic device 10 is in the flat state (for example, FIG. 2A), the first housing structure 510 and the second housing structure 520 may form the angle of 180° and may be disposed to face in the same direction. A surface of the first area 201 of the display 200 and a surface of the second area 202 may form the angle of 180° with each other, and may face in the same direction (for example, the front surface direction of the electronic device). The folding area 203 may form the same plane as the first area 201 and the second area 202.

In an embodiment of the disclosure, when the electronic device 10 is in the folded state (for example, FIG. 2B), the first housing structure 510 and the second housing structure 520 may be disposed to face each other. The surface of the first area 201 of the display 200 and the surface of the second area 202 may face each other while forming a small angle (for example, between 0° and 10°) with each other. At least part of the folding area 203 may have a curved surface having a predetermined curvature.

In an embodiment of the disclosure, when the electronic device 10 is in the intermediate state (for example, FIG. 2B), the first housing structure 510 and the second housing structure 520 may be disposed with a certain angle. The surface of the first area 201 of the display 200 and the surface of the second area 202 may form an angle that is larger than in the folded state and is smaller than in the flat state. At least part of the folding area 203 may have a curved surface having a predetermined curvature, and the curvature in this state may be smaller than in the folded state.

Figure 2C:
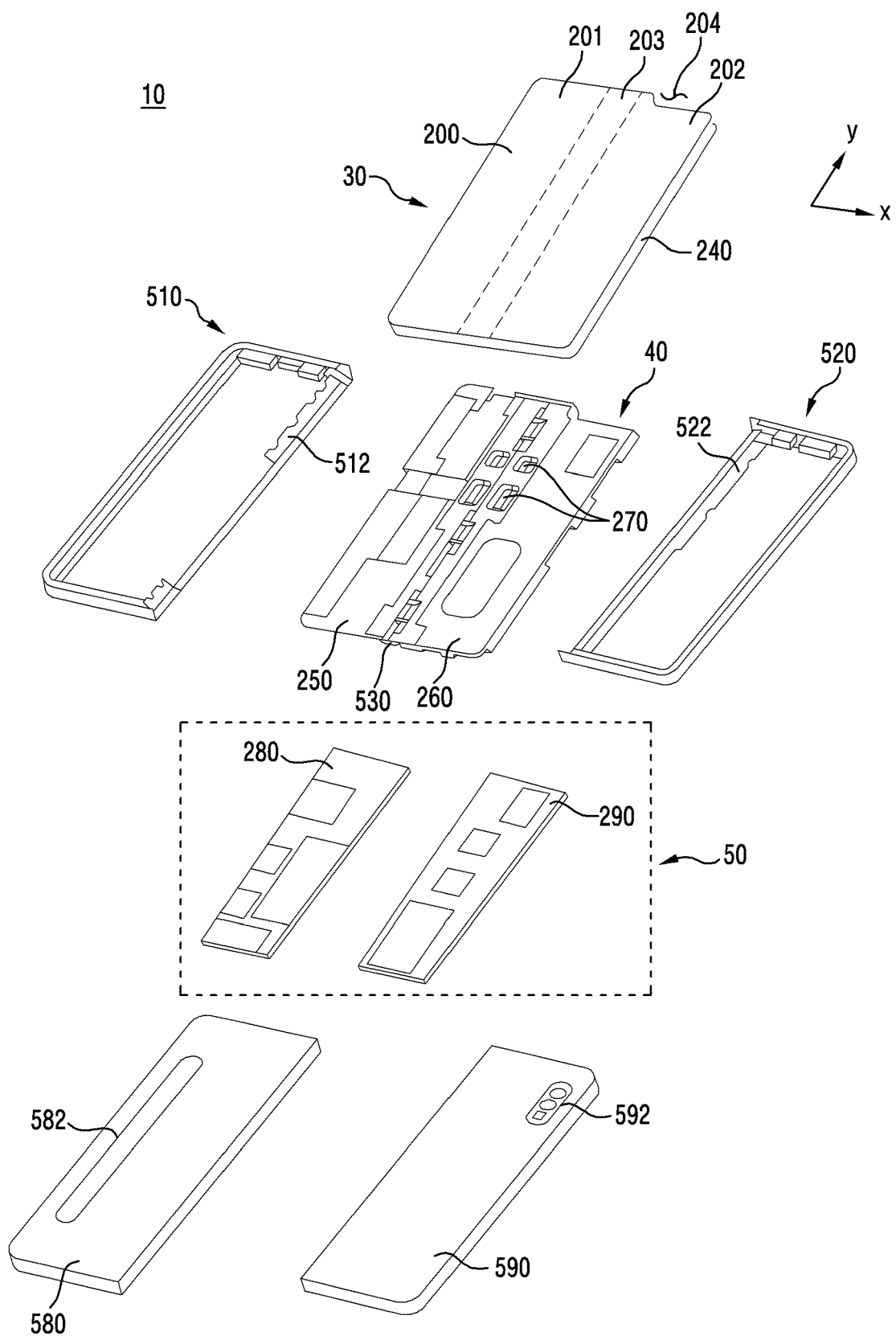
FIG. 2C is an exploded perspective view of an electronic device according to an embodiment of the disclosure.

FIG. 2C is an exploded perspective view of the electronic device according to an embodiment of the disclosure.

Referring to FIG. 2C, in an embodiment of the disclosure, the electronic device 10 may include a display unit 30, a bracket assembly 40, a board unit 50, a first housing structure 510, a second housing structure 520, a first rear surface cover 580, and a second rear surface cover 590. In an embodiment the disclosure, the display unit 30 may be referred to as a display module or a display assembly.

The bracket assembly 40 may include a first bracket 250, a second bracket 260, a hinge structure disposed between the first bracket 250 and the second bracket 260, a hinge cover 530 to cover the hinge structure when it is viewed from the outside, and a wire member 270 (for example, a flexible printed circuit (FPC)) crossing over the first bracket 250 and the second bracket 260.

In an embodiment of the disclosure, the bracket assembly 40 may be disposed between the display unit 30 and the board unit 50. For example, the first bracket 510 may be disposed between the first area 201 of the display 200 and a first board 290. The second bracket 260 may be disposed between the second area 202 of the display 200 and a second board 290.

In an embodiment of the disclosure, the wire member 270 and at least part of the hinge structure 300 may be disposed inside the bracket assembly 40. The wire member 270 may be disposed in a direction (for example, an x-axis direction) of crossing over the first bracket 250 and the second bracket 260. The wire member 270 may be disposed in a direction (for example, the x-axis direction) perpendicular to a folding axis (for example, the y-axis or the folding axis A of FIG. 2A) of the folding area 203 of the electronic device 10.

As mentioned above, the board unit 50 may include the first board 290 disposed on a first bracket in a first area 410, and the second board 290 disposed on the second bracket 260 side. The first board 290 and the second board 290 may be disposed in a space formed by the bracket assembly 40, the first housing structure 510, the second housing structure 520, the first rear surface cover 580, and the second rear surface cover 590. Components for implementing various functions of the electronic device 10 may be mounted on the first board 290 and the second board 290.

The first housing structure 510 and the second housing structure 520 may be assembled with each other to be coupled to both sides of the bracket assembly 40 with the display unit 30 being coupled to the bracket assembly 40. As will be described below, the first housing structure 510 and the second housing structure 520 may slide from both sides of the bracket assembly 40 and may be coupled with the bracket assembly 40.

In an embodiment of the disclosure, the first housing structure 510 may include a first rotation support surface 512, and the second housing structure 520 may include a second rotation support surface 522 corresponding to the first rotation support surface 512. The first rotation support surface 512 and the second rotation support surface 522 may include curved surfaces corresponding to curved surfaces included in the hinge cover 530.

In an embodiment of the disclosure, when the electronic device 10 is in the flat state (for example, the electronic device of FIG. 2A), the first rotation support surface 512 and the second rotation support surface 522 may cover the hinge cover 530, such that the hinge cover 530 is not exposed to the rear surface of the electronic device 10 or is exposed to the minimum. On the other hand, when the electronic device 10 is in the folded state (for example, the electronic device of FIG. 2B), the first rotation support surface 512 and the second rotation support surface 522 may rotate along the curved surface included in the hinge cover 530, such that the hinge cover 530 is exposed to the rear surface of the electronic device 10 to the maximum.

In an embodiment of the disclosure, a photosensor 230 may be disposed to face in the same direction as a direction in which the display 200 is seen. For example, the photosensor 230 may be disposed to collect light through the front surface of the electronic device 10. The photosensor 230 may collect light through the front surface of the electronic device 10, and may output data or a signal related to illuminance of the front surface of the electronic device 10.

According to the illustrated embodiment of the disclosure, the photosensor 230 may be disposed on an area corresponding to a notch 240 of the display 200, but embodiments of the disclosure are not limited thereto. For example, according to an embodiment of the disclosure, the photosensor 230 may be disposed on a rear surface of the display 200. When the photosensor 230 is disposed on the rear surface of the display 220, the notch 204 of the electronic device 10 may be reduced, so that the display 200 which is relatively large compared to the size of the electronic device 10 may be provided.

According to an embodiment of the disclosure, the photosensor 230 may include a plurality of measurement elements to generate an electric signal in reaction to light. The measurement elements may be, for example, photodiodes. The photodiode may generate a current in reaction to light, and the photo sensor 230 may output a signal or data related to illuminance based on the current generated from the photodiode.

The electronic device 10 may include a motion sensor although it is not illustrated in FIG. 2A. The electronic device 10 may detect a motion of the electronic device through the motion sensor. In an embodiment of the disclosure, the motion sensor may include an acceleration sensor.

Figure 3A:
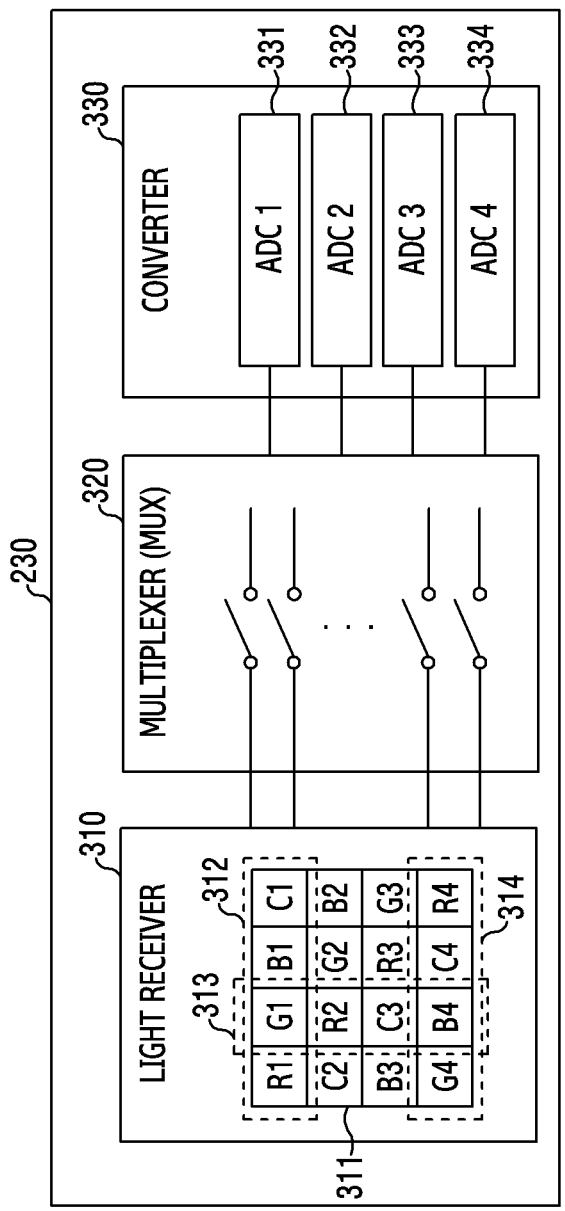
FIG. 3A is a view illustrating a configuration of a photosensor of an electronic device according to an embodiment of the disclosure.

FIG. 3A is a view illustrating a configuration of a photosensor of an electronic device according to an embodiment of the disclosure.

Figure 3B:
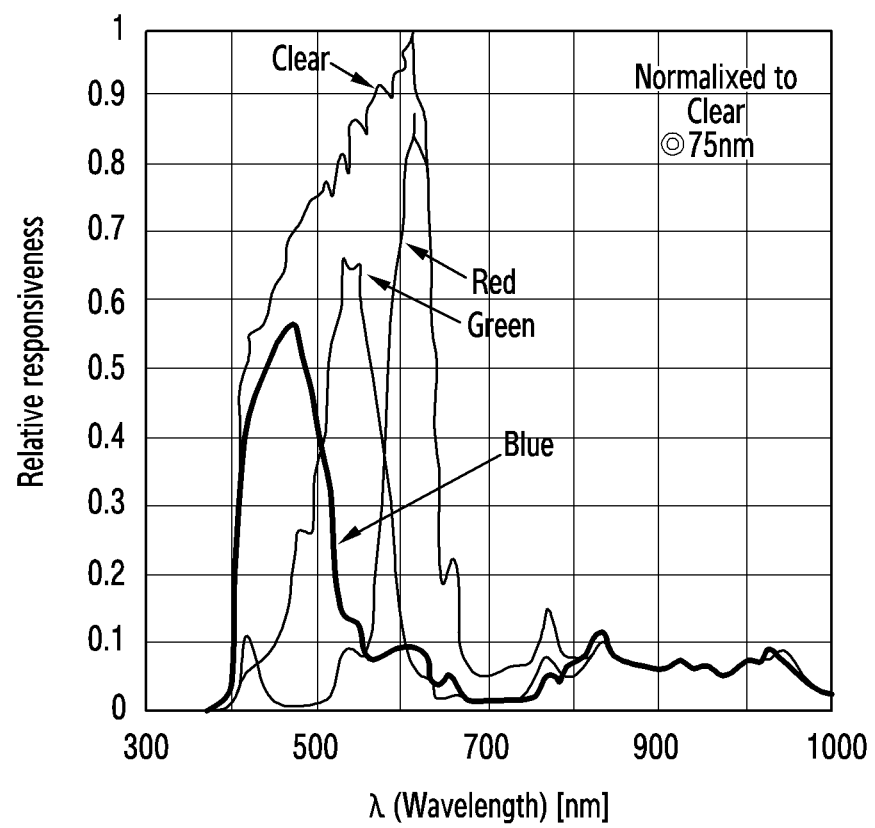
FIG. 3B is a graph illustrating responsiveness of a photodiode according to color of a color filter according to an embodiment of the disclosure.

FIG. 3B is a graph illustrating responsiveness of a photodiode according to color of a color filter according to an embodiment of the disclosure.

Referring to FIGS. 3A and 3B, the photosensor 230 may include a light receiver 310, a multiplexer (hereinafter, 'MUX') 320, and a converter 330. According to an embodiment of the disclosure, the photosensor 230 may further include a calculator (not shown) to calculate an illuminance value by using an output of the converter 330.

The light receiver 310 may generate an analogue signal in reaction to emitted light. The analogue signal acquired through the light receiver 310 may be transmitted to the converter 330 through the MUX 320, and the converter 330 may convert analogue data into digital data. According to an embodiment of the disclosure, the light receiver 310 may include a photodiode array 311 in which a plurality of photodiodes are arranged in the form of nxn or nxm. According to an embodiment of the disclosure, referring to FIG. 3A, the light receiver 310 of the photosensor 230 may include 16 photodiodes forming an arrangement of 4×4.

According to an embodiment of the disclosure, the photodiodes may include color filters, and may be divided into four types according to colors of the color filters. For example, the photodiode may be one of a red photodiode including a red filter, a green photodiode including a green filter, a blue photodiode including a blue filter, or a clear photodiode without a filter. Since light emitted to a front surface of the electronic device reaches the photodiode through the color filter, when the photodiode includes the color filter, the photodiode may output data related to an intensity of light corresponding to the color filter. For example, the red photodiode may output data related to an intensity of light of about 650 nm band (wavelength) in light emitted to the photosensor 230. Referring to FIG. 3B, responsiveness of the photodiode to wavelengths may vary according to color of the color filter. The blue photodiode may show high responsiveness to light of about 450 nm band, the green photodiode may show high responsiveness to light of about 550 nm band, and the red photodiode may show high responsiveness to light of about 650 nm band. The clear photodiode may show high responsiveness to light from about 450 nm to about 650 nm band.

Referring to FIG. 3A, the photodiode array 311 may include 16 photodiodes arranged in the form of 4×4, and may include four photodiodes per type. Hereinafter, for convenience of explanation, four red photodiodes may be referred to as R1, R2, R3, R4, four green photodiodes may be referred to as G1, G2, G3, G4, four blue photodiodes may be referred to as B1, B2, B3, B4, and four clear photodiodes may be referred to as C1, C2, C3, C4.

According to an embodiment of the disclosure, all columns and rows of the array may include all of the four types of photodiodes. For example, referring to FIG. 3A, a first row 312 may include R1, G1, B1, C1, and a second column 313 may include G1, R2, C3, B4. However, the arrangement of the photodiodes is not limited to the embodiment of FIG. 3A, and in another embodiment of the disclosure, the photodiodes may be randomly arranged.

According to an embodiment of the disclosure, the converter 330 may convert the analogue signal generated at the light receiver 310 into a digital signal. The converter 330 may include at least one analogue-to-digital converter (ADC) 331, 332, 333, 334. The converter 330 may be connected with at least one photodiode among the plurality of photodiodes through the MUX 320. The processor 210 may change a combination of the photodiodes connected with the converter 330 through the MUX 320. For example, the processor 210 may arbitrarily select at least one photodiode connected with the converter 330 by controlling the MUX 320. For example, the processor 210 may connect a first ADC 331 to R1, R2, R3, R4 at a first time through the MUX 320, and may connect the first ADC to R1 at a second time.

According to an embodiment of the disclosure, the photodiodes of the same type may be connected with one ADC (for example, the first ADC 331). For example, the processor 210 may connect R1, R2, R3, R4 to the first ADC 331, G1, G2, G3, G4 to a second ADC 332, B1, B2, B3, B4 to a third ADC 333, C1, C2, C3, C4 to a fourth ADC 334, respectively, through the MUX 320.

According to an embodiment of the disclosure, not only the photodiodes of the same type but also the photodiodes of different types may be connected to one ADC. For example, the first ADC 331 may be connected with R1, G1, B1, C1 through the MUX 320.

According to an embodiment of the disclosure, photodiodes forming a specific column (or row, the same is applied hereinafter) in the photodiode array 331 may be connected to one ADC (for example, the first ADC 331) through the MUX 320. In an embodiment of the disclosure, the processor 210 may measure an intensity of light emitted to each column of the photodiode array 311 by using the MUX 320. The processor 210 may measure intensities of light shining on respective columns, and may estimate an incident angle of light emitted to the photosensor 230 by comparing the measured intensities of light with one another. For example, R1, G1, B1, C1 constituting the first row 312 in the photodiode array 311 may be connected to the first ADC 331, and G4, B4, C4, R4 constituting a fourth row 314 may be connected to the second ADC 332. The processor 210 may acquire intensities of light emitted to the first row 312 and the fourth row 314 of the light receiver 310 from the first ADC 331 and the second ADC 332, respectively, and may compare the intensities of light emitted to the first row 312 and the fourth row 314, based on the acquired intensities of light.

According to an embodiment of the disclosure, any one photodiode of the photodiode array 311 may be connected to one ADC through the MUX 320. The processor 210 may measure an intensity of light emitted to the single photodiode by using the MUX 320. The processor 210 may measure intensities of light from two photodiodes which are spaced apart from each other, and may estimate an incident angle of light emitted to the photosensor 230, by comparing the measured intensities of light. For example, R1 may be connected with the first ADC 331, and R4 which is spaced apart from R1 may be connected with the second ADC 332 through the MUX 320. The processor 210 may acquire intensities of light emitted to R1 and R4, and may compare the intensities of light emitted to R1 and R4, based on the acquired intensities of light.

In an embodiment the disclosure, an intensity of light emitted to a photodiode may be a value that is determined according to a digital signal acquired through an ADC connected with the photodiode. In an embodiment the disclosure, the processor 210 measuring or acquiring an intensity of light may refer to acquiring a signal or data related to the intensity of light.

Figure 4A:
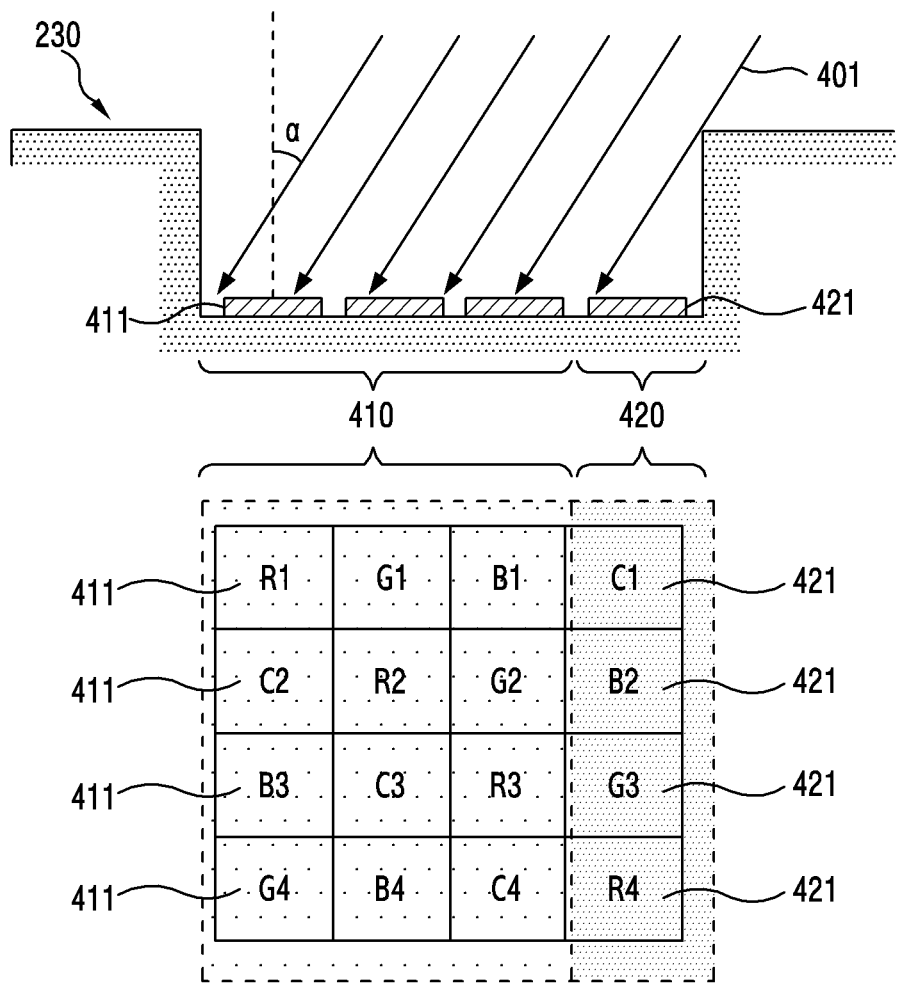
FIG. 4A is a view illustrating light emitted to a light receiver of a photosensor when an incident angle of the light, which is not 0, is emitted to an electronic device according to an embodiment of the disclosure.
Figure 4B:
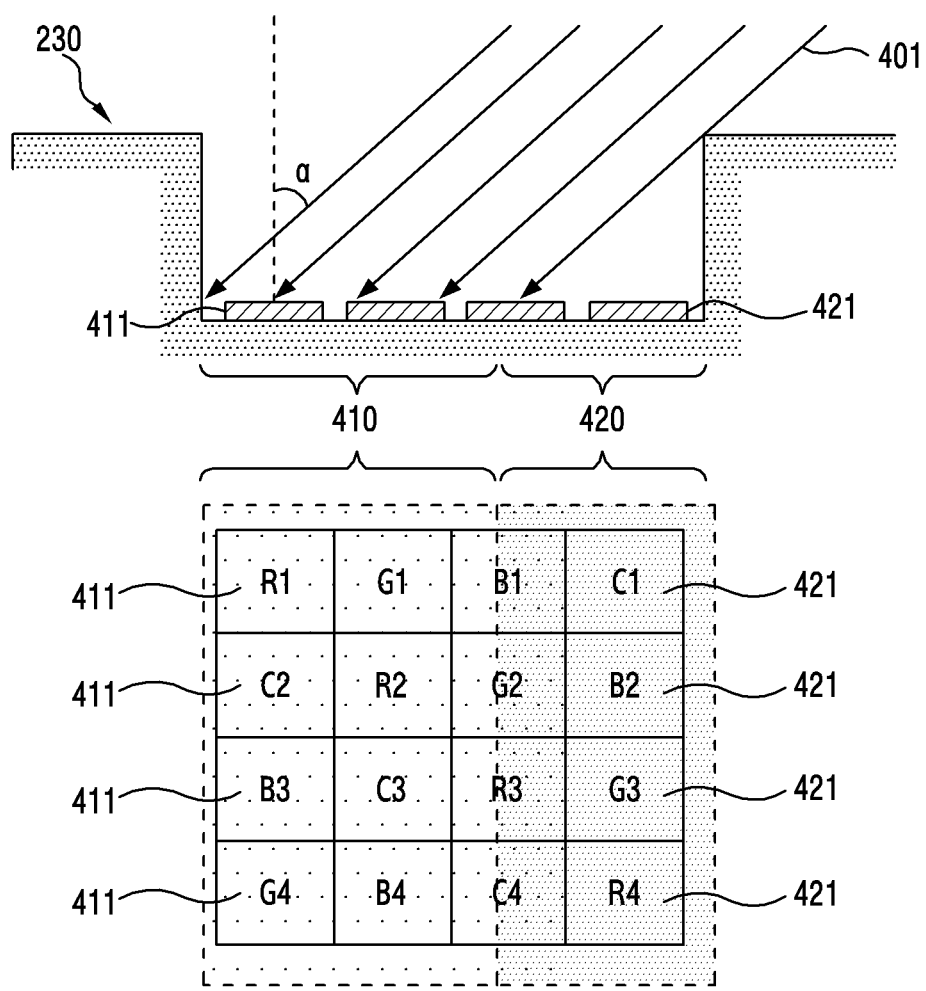
FIG. 4B is a view illustrating light emitted to a light receiver of a photosensor when an incident angle of the light which is larger than in FIG. 4A, is emitted to an electronic device according to an embodiment of the disclosure.

FIGS. 4A and 4B illustrate light emitted to a light receiver of a photosensor when an incident angle of the light which is not 0 (hereinafter, 'side light') is emitted to an electronic device according to various embodiments of the disclosure.

Referring to FIGS. 4A and 4B, when light 401 is emitted to the light receiver 310 of the photosensor 230, the light 401 may not directly reach some areas of the light receiver 310 due to an obstacle (for example, a housing structure of the photosensor 230, a printed area of a window disposed above the photosensor 230) around the light receiver 310, such that shadows appear on the corresponding areas. For example, the light receiver 310 of the photosensor 230 may include an area that the light 401 directly reaches (hereinafter, a 'first area') 410, and an area that the light 401 does not directly reach or light of a weak intensity reaches (hereinafter, a 'second area') 420. An intensity of light 401 measured at a photodiode 411 disposed in the first area 410 may be stronger than an intensity of light 401 measured at a photodiode 421 disposed in the second area 420.

Referring to FIG. 4B, when an incident angle (a) of light 401 emitted to the photosensor 230 increases, the first area 410 may be reduced and the second area 420 may increase. In this case, a difference between the intensity of light 401 measured at the photodiode 411 disposed in the first area 410 and the intensity of light 401 measured at the photodiode 421 disposed in the second area 420, or a ratio of intensity may increase.

Figure 5:
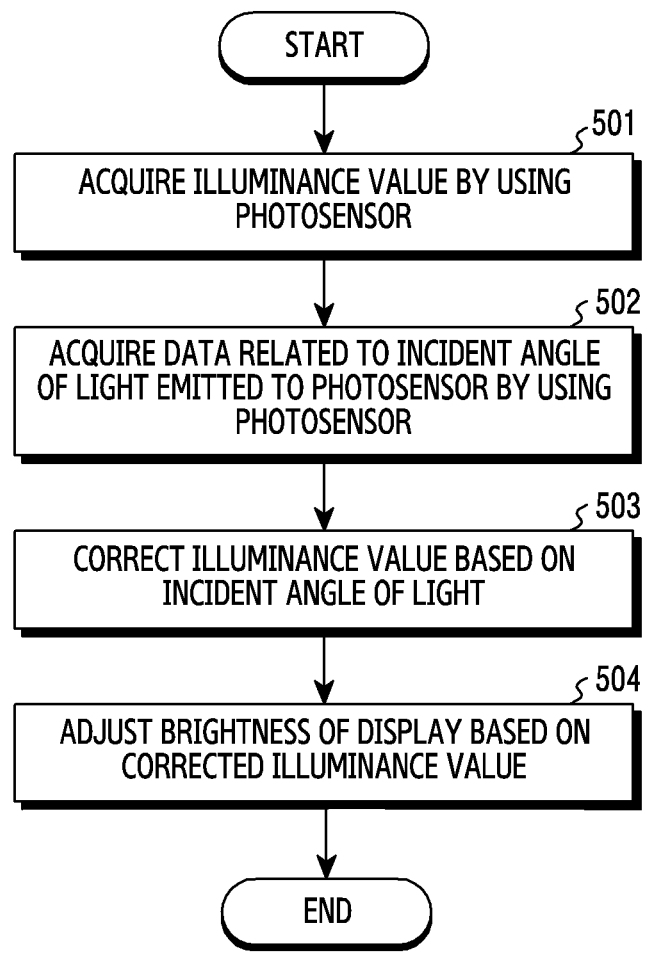
FIG. 5 is a sequence diagram illustrating correcting an illuminance value measured by a photosensor, based on an incident angle of light measured by a photosensor, by using the photosensor in an electronic device according to an embodiment of the disclosure.

FIG. 5 is a sequence diagram illustrating correcting an illuminance value measured at a photosensor, based on an incident angle of light measured by a photosensor, by using the photosensor in an electronic device according to an embodiment of the disclosure.

Referring to FIG. 5, in operation 501, the processor 210 may measure illuminance on a front surface of the electronic device by using the photosensor 230. In operation 501, the processor 210 may connect each ADC with photodiodes of the same type through the MUX 320, thereby acquiring data regarding an intensity of light of a band corresponding to each type. For example, the processor 210 may acquire data related to an intensity of light of a band corresponding to a red filter, from photodiodes including the red filter in the photodiode array 311. According to an embodiment of the disclosure, the processor 210 may four data for each type, and may calculate an illuminance value based on the acquired data. According to another embodiment of the disclosure, a circuit included in the photosensor 230 may output an illuminance value based on data acquired from each ADC.

On the other hand, when side light is emitted to the front surface of the electronic device, an illuminance value acquired through the photosensor 230 may differ from real illuminance of the front surface of the electronic device. In the following operation, the electronic device may correct an illuminance value acquired through the photosensor 230, based on an incident angle of light shining on the front surface of the electronic device.

In operation 502, the processor 210 may acquire information regarding an incident angle of light shining on the photosensor 230. In an embodiment of the disclosure, the information regarding the incident angle of light may include an incident angle of light, a range of the incident angle of light, information on whether light is side light or not. In an embodiment the disclosure, the incident angle of light may refer to an incident angle of light shining on the photosensor 230 (or the light receiver 310 of the photosensor 230).

In an embodiment of the disclosure, the processor 210 may use two or more photodiode sub-sets (hereinafter, 'subset') including at least one photodiode to measure an intensity of light shining on an area corresponding to each subset. In an embodiment of the disclosure, the subset may include at least one photodiode. In an embodiment of the disclosure, the processor 210 may acquire an intensity of light shining on a first area where at least one photodiode constituting a first subset is disposed, and an intensity of light shining on a second area where at least one photodiode constituting a second subset is disposed. For example, in the example shown in FIG. 3A, the processor 210 may set at least one photodiode (for example, R1) disposed in the first row 312 to the first subset, and may set at least one photodiode (for example, R4) disposed on the fourth row 314 to the second subset.

In an embodiment of the disclosure, the processor 210 may acquire an intensity of light from a certain subset or a certain photodiode included in the light receiver 310 by using the MUX 320 and the converter 330. According to an embodiment of the disclosure, the processor 210 may connect one or more photodiodes disposed in an interested area of the light receiver 310 to the converter 330 by using the MUX 320, and may acquire data related to an intensity of light 401 shining on the interested area from the converter 330. In an embodiment of the disclosure, the processor 210 may connect one or more photodiodes disposed in a plurality of interested areas included in the light receiver 310 to different ADCs, by using the MUX 320. In an embodiment of the disclosure, referring to FIG. 3A, the first subset including at least one photodiode included in the first row 312 may be connected to the first ADC 331, and the second subset including at least one photodiode included in the fourth row 314 may be connected to the second ADC 332. Referring to FIG. 4A, in an embodiment of the disclosure, R1 disposed in the first area 410 may be connected to the first ADC 331, and R4 disposed in the second area 420 may be connected to the second ADC 332. In an embodiment of the disclosure, the processor 210 may acquire information regarding an incident angle of light shining on the photosensor 230, based on a signal (or data) acquired from two or more ADCs connected with two or more subsets, respectively. In an embodiment of the disclosure, the processor 210 may acquire an intensity of light shining on the first/second area from the first/second ADC 331/332 connected with the first/second subset corresponding to the photodiode disposed in the first/second area of the light receiver 310.

According to an embodiment of the disclosure, the processor 210 may determine at least one photodiode constituting a subset, based on a position of the photodiode on the light receiver 310. In an embodiment of the disclosure, the processor 210 may determine at least one photodiode disposed in the first area of the light receiver 310 to the first subset, and may determine at least one photodiode disposed in the second area of the light receiver 310 to the second subset. For example, the first subset may be configured with at least one photodiode disposed on one side of the light receiver 310, and the second subset may be configured with at least one photodiode disposed on the other side of the light receiver 310.

In an embodiment of the disclosure, the processor 210 may use a plurality of subsets including only one photodiode. In this case, a photodiode included in one subset may be the same type as a photodiode included in another subset to be compared. For example, when the first subset includes a red photodiode, the second subset may also include a red photodiode. A type of a single photodiode included in a subset may be any one of red, green, blue, clear types, but the red type may be preferentially selected. Since red light has a longer wavelength than light of other types, using a photodiode of the red type may be more advantageous in estimating an incident angle of light than using photodiodes of other types.

In an embodiment of the disclosure, the processor 210 may acquire information regarding an incident angle of light by comparing intensities of light shining on two or more areas. In an embodiment of the disclosure, the processor 210 may estimate a slope (or incident angle) of side light by comparing intensities of light shining on two or more areas. In an embodiment of the disclosure, the processor 210 may determine that, as a difference between an intensity of light shining on the first area (hereinafter, a first intensity) and an intensity of light shining on the second area (hereinafter, a second intensity) is larger, the incident angle of light is larger, and as the difference between the first intensity and the second intensity is smaller, the incident angle of light is smaller. In an embodiment of the disclosure, the processor 210 may determine whether light shining on the light receiver 310 is side light, based on whether a ratio of the first intensity to the second intensity exceeds a threshold value. In an embodiment of the disclosure, when the ratio of the first intensity to the second intensity falls within a first range, the processor 210 may determine that the incident angle of light is at a first level, and, when the ratio falls within a second range, the processor 210 may determine that the incident angle of light is at a second level. The processor 210 may determine a degree of correcting an illuminance value in operation 503, which will be described below, according to a level of the incident angle.

In an embodiment of the disclosure, each column or each row of the photodiode array 311 may include photodiodes of the same type. In an embodiment of the disclosure, in the photodiode array 311 of nxm, the first to n-th rows may include photodiodes of a first type. In an embodiment of the disclosure, in the photodiode array 311 of nxm, the first to m-th columns may include the photodiodes of the first type. For example, referring to FIG. 4A, the first column, the second column, the third column, and the fourth column from the left side of the light receiver 310 may include red photodiodes R1, R2, R3, and R4, respectively. The first row, the second row, the third row, and the fourth row from the upper side of the light receiver 310 may include red photodiodes R1, R2, R3, and R4, respectively.

In an embodiment of the disclosure, when each of the photodiodes of the first type is arranged on each column, the electronic device may measure intensities of light from the respective photodiodes of the first type, and may compare the intensities of light shining on the respective columns. For example, the electronic device may compare intensities of light shining on the first to fourth columns by using the photodiodes of the first type. In an embodiment of the disclosure, the photodiodes of the first type may be set to be included in different subsets so as to measure intensities of light shining on the respective columns. In an embodiment of the disclosure, the electronic device may set the photodiodes of the first type disposed on the first column/second column/third column/fourth column to the first subset/second subset/third subset/fourth subset.

For example, R1 disposed on the first column may be set to the first subset, R2 disposed on the second column may be set to the second subset, R3 disposed on the third column may be set to the third subset, and R4 disposed on the fourth column may be set to the fourth subset. In this case, the processor 210 may acquire intensities of light shining on the first to fourth columns from R1 to R4, and may determine a slope of light shining on the light receiver 310.

In an embodiment of the disclosure, the processor 210 may determine whether side light shines on the light receiver 310, by comparing the intensities of light shining on the first to fourth columns. In an embodiment of the disclosure, the processor 210 may determine that side light facing in a first direction shines on the light receiver 310, based on determining that the intensity of light shining on the first column is weaker than the intensity of light shining on the fourth column which is spaced apart from the first column in the first direction. The processor 210 may determine that side light facing in a second direction which is opposite to the first direction shines on the light receiver 310, based on determining that the intensity of light shining on the first column is stronger than the intensity of light shining on the fourth column which is spaced apart from the first column in the first direction.

In an embodiment of the disclosure, the processor 210 may determine a degree of titling of side light by comparing the intensities of light shining on the first to fourth columns. In an embodiment of the disclosure, the processor 210 may determine the degree of tiling of side light according to a ratio of an intensity of light shining on the first column (hereinafter, a first intensity) and an intensity of light shining on the fourth column (hereinafter, a second intensity). In an embodiment of the disclosure, when a ratio of the first intensity to the second intensity falls within a first range, the processor 210 may determine that an incident angel of light is at a first level, and, when the ratio falls within a second range, the processor 210 may determine that the incident angle of light is at a second level.

In an embodiment of the disclosure, the processor 210 may determine that an incident angle of side light shining on the light receiver 310 is relatively large, based on determining that stronger light shines on the first column than on the fourth column, and determining that a difference between intensities of light shining on the first to third columns is not great.

In an embodiment of the disclosure, the processor 210 may compare intensities of light according to photodiode types. In an embodiment of the disclosure, the processor 210 may acquire first information regarding side light shining on the light receiver by using first type photodiodes, and may acquire second information regarding side light shining on the light receiver 310 by using second type photodiodes.

In an embodiment of the disclosure, the processor 210 may acquire the first information regarding side light shining on the light receiver 310, by using the first to fourth subsets configured with the first type photodiodes included in different columns, and may acquire the second information regarding side light shining on the light receiver 310 by using fifth to eighth subsets configured with the second type photodiodes included in different columns. For example, the processor 210 may compare intensities of light shining on R1 to R4 primarily, and then, may compare intensities of light shining on G1 to G4 secondarily, thereby estimating an incident angle of light. Since the photodiodes are arranged in the light receiver 310 in a different pattern according to a type, the incident angle of light may be estimated with relative exactness by comparing the intensities of light according to a type. In general, it may be advantageous to detect side light by using red photodiodes which well detect red color, but it may be more advantageous to detect side light by using photodiodes of other types all together according to a property of ambient light.

In operation 503, the processor 210 may correct the illuminance value by considering the incident angel of light. In an embodiment of the disclosure, the processor 210 may correct the illuminance value acquired through the photosensor 230, based on the incident angle of light acquired by using the photosensor 230. In an embodiment of the disclosure, the processor 210 may control a degree of correcting the illuminance value according to the incident angle. In an embodiment of the disclosure, as the incident angle is larger, a dark area formed on the light receiver increases, and accordingly, the degree of correcting the illuminance value may increase.

In an embodiment of the disclosure, when the incident angle of light falls within the first range (or first level), the processor 210 may correct a first illuminance value (for example, an illuminance value acquired through operation 501) acquired through the photosensor 230 to a second illuminance value. When the incident angle of light falls within the second range (or second level) different from the first range (or first level), the processor 210 may correct the first illuminance value acquired through the photosensor 230 to a third illuminance value which is different from the second illuminance value.

In an embodiment of the disclosure, the processor 210 may determine the illuminance value according to Equation 1. In Equation 1, R may be an intensity of light acquired through red photodiodes (for example, R1 to R4 of FIG. 4A) connected to the first ADC, G may be an intensity of light acquired through green photodiodes (for example, G1 to G4 of FIG. 4A) connected to the second ADC, B may be an intensity of light acquired through blue photodiodes (for example, B1 to B4 of FIG. 4A) connected to the third ADC, C may be an intensity of light acquired through clear photodiodes (for example, C1 to C4 of FIG. 4A) connected to the fourth ADC.

$$\text{Illuminance value} = \{(R \times 0.13) + (G \times 0.26) + (B \times -0.08) + (C \times 0.003)\} \times \text{coefficient} \quad \text{Equation 1}$$

In an embodiment of the disclosure, the electronic device may determine a coefficient to be applied to Equation 1, based on the incident angle of light. In an embodiment of the disclosure, the electronic device may apply a coefficient having a first value regarding light having a first incident angle to Equation 1, and may apply a coefficient having a second value regarding light having a second incident angle to Equation 1.

In an embodiment of the disclosure, the electronic device may determine the coefficient to be applied to Equation 1 according to a ratio of intensities of light shining on areas distinguished from each other in the light receiver 310. In an embodiment of the disclosure, when the ratio of the intensities of light falls within the first range, the electronic device may apply the coefficient having the first value to Equation 1, and, when the ratio of the intensities of light falls within the second range, the electronic device may apply the coefficient having the second value to Equation 1.

In an embodiment of the disclosure, the electronic device may determine the coefficient of Equation 1 according to Table 1. Table 1 shows coefficients applied to Equation 1 according to a ratio of an intensity of light shining on R1 to an intensity of light shining on R4 when R1 is disposed on one side of the light receiver 310 and R4 is disposed on the other side like the light receiver 310 shown in FIG. 4A. In Table 1, R1/R4 refers to a ratio of an intensity of light shining on R1 to an intensity of light shining on R4. According to Table 1, the processor 210 may determine the coefficient of Equation 1 to 10, based on determining that the value of R1/R4 falls within the first range (for example, a range larger than 0 and smaller than 0.1). In another example, the processor 210 may determine the coefficient of Equation 1 to 5, based on determining that the value of R1/R4 falls within the second range (for example, a range larger than 0.1 and smaller than 0.3).

TABLE 1

| Ratio | coefficient |
|---|---|
| 0 < R1/R4 < 0.1 | 10 |
| 0.1 < R1/R4 < 0.3 | 5 |
| 0.3 < R1/R4 < 0.5 | 3 |
| 0.5 < R1/R4 < 1 | 2 |

Table 1 shows coefficients according to the range of R1/R4 when R4 is larger than R1. However, the processor 210 may determine the coefficient shown in Table 1 according to a ratio of R4/R1 when R1 is larger than R4. For example, the processor 210 may determine the coefficient to 10, based on determining that a value of R4/R1 is smaller than 0.1. According to Table 1, the range of the value of R1/R4 is divided into four ranges, but embodiments of the disclosure are not limited thereto. In another embodiment of the disclosure, the value of R1/R4 may be divided into five or more segmented ranges. In operation 504, the electronic device may adjust brightness of the display 220, based on the corrected illuminance value. According to an embodiment of the disclosure, the processor 210 may acquire an illuminance value close to real illuminance of the electronic device, by considering the incident angle of light measured at the photosensor 230, and accordingly, may adjust brightness of the display 220 to be suitable for a real surrounding environment of the electronic device.

According to an embodiment of the disclosure, operations 501 to 504 may be performed repeatedly or periodically while the function of automatically adjusting the brightness of the display 220 is performed. Although FIG. 5 illustrates that all of operations 501 to 504 are performed, this should not be considered as limiting, and some operations may be omitted. For example, operation 502 may be performed only when a specific condition is satisfied.

In an embodiment of the disclosure, the processor 210 may not perform operation 502 every time brightness of the display is adjusted by using the photosensor 230. According to an embodiment of the disclosure, the processor 210 may perform operation 502 if necessary, while periodically performing operations 501, 503, and 504. In an embodiment of the disclosure, the processor 210 may estimate a new incident angle by performing operation 520 based on whether a defined condition is satisfied. In an embodiment of the disclosure, a period in which operation 501 is performed may be different from a period in which operation 502 is performed. For example, operation 501 may be performed 60 times per second, whereas operation 502 may be performed 15 times per second. In this case, the illuminance value may be corrected one time by considering the incident angle of light while the brightness of the display is refined 4 times according to the illuminance value. In an embodiment of the disclosure, when a motion of the electronic device is detected, the processor 210 may increase the frequency of performing operation 502. For example, based on the motion of the electronic device being detected, the processor 210 may increase the frequency of performing operation 502 from 15 times per second to 30 times per second. In an embodiment of the disclosure, when the electronic device is a foldable device, the processor 210 may increase the frequency of performing operation 502, based on a change in a folding angle being detected.

In an embodiment of the disclosure, the processor 210 may estimate a new incident angle by performing operation 502 based on whether a change in the illuminance value is detected or whether a change in the posture of the electronic device is detected. When the change in the posture of the electronic device is caused, the incident angle of light shining on the photosensor 230 may change, and accordingly, it may be necessary to correct the illuminance value based on a new incident angle.

In an embodiment of the disclosure, it may be determined whether operation 502 will be performed, based on whether an illuminance value of ambient light of a space where the electronic device is placed falls within a designated range. In an embodiment of the disclosure, when the illuminance of the ambient light falls out of the designated range, the electronic device may not perform operation 502. This is because it is difficult to determine the incident angle of light when brightness of ambient light is very high or low.

Figure 6:
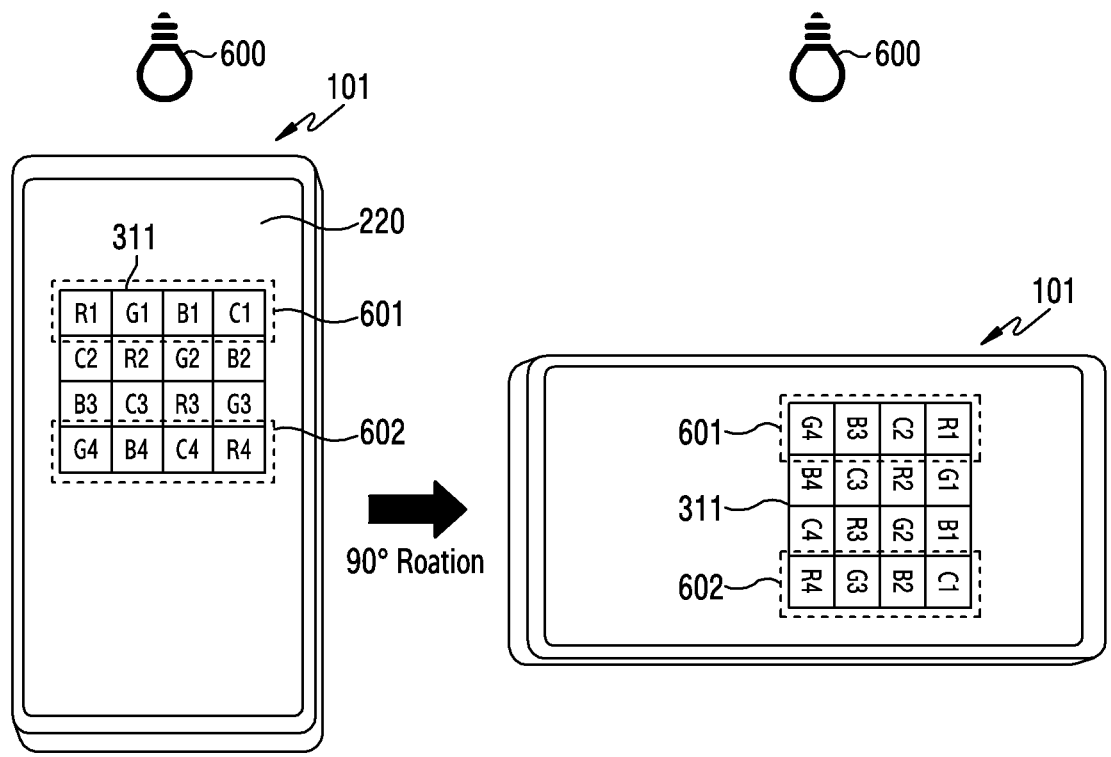
FIG. 6 is a view illustrating change of photodiodes constituting a subset when an electronic device is rotated according to an embodiment of the disclosure.

FIG. 6 illustrates change of photodiodes constituting a subset according to an embodiment of the disclosure.

Referring to FIG. 6, in an embodiment of the disclosure, the processor 210 may change (or refine) photodiodes used for estimating an incident angle, based on a change in the state of the electronic device, in order to exactly determine an incident angle of light shining on the light receiver 310. In an embodiment of the disclosure, the photodiodes being changed may include some or all of the photodiodes constituting subsets used for estimating the incident angle being replaced with other photodiodes.

In an embodiment of the disclosure, when the electronic device is in a first state, the processor 210 may determine an incident angle by using a first subset including a first photodiode group and a second subset including a second photodiode group, and, when the electronic device is in a second state, the processor 210 may determine an incident angle by using the first subset including a third photodiode group and the second subset including a fourth photodiode group. In another embodiment of the disclosure, the photodiodes used for estimating the incident angle being changed may include changing existing subsets to other subsets. In an embodiment of the disclosure, when the electronic device is in the first state, the processor 210 may determine an incident angle by using the first subset and the second subset, and, when the electronic device is in the second state, the processor 210 may determine an incident angle by using the third subset and the fourth subset.

In an embodiment of the disclosure, the change in the state of the electronic device may include a change in an intensity of ambient light, a change in a direction or position of the electronic device, or a change in an angle of the electronic device when the electronic device is a foldable device. In an embodiment of the disclosure, the processor 210 may detect a change in ambient light by using the photosensor 230, and may detect a change in the direction or position of the electronic device by using an acceleration sensor (or a motion sensor).

In an embodiment of the disclosure, when the electronic device is in the first state, the processor 210 may estimate an incident angle of light shining on the light receiver 310, by using a first subset including at least one photodiode disposed in a first area of the light receiver 310, and a second subset including at least one photodiode disposed in a second area of the light receiver 310. In an embodiment of the disclosure, based on detecting that the state of the electronic device changes from the first state to the second state, the processor 210 may change the photodiode constituting the first subset to at least one photodiode disposed in a third area which is different from the first area of the light receiver 310, and may change the photodiode constituting the second subset to at least one photodiode disposed in a fourth area which is different from the second area. Referring to FIG. 6, the processor 210 may change some or all of the photodiodes constituting a subset, based on detecting a change in a direction of a light source of the electronic device. When there exists a light source 600 above the electronic device at a first time, the processor 210 may designate photodiodes constituting the first row in the photodiode array 311 as a first subset 601, and may designate photodiodes constituting the fourth row as a second subset 602. When the electronic device is rotated in the clockwise direction at a second time, the processor 210 may designate the photodiodes constituting the first column in the photodiode array 311 as the first subset 601, and may designate the photodiodes constituting the fourth column as the second subset 602. In the illustrated embodiment of the disclosure, the first subset and the second subset include a plurality of photodiodes, but this should not be considered as limiting. In another embodiment of the disclosure, each of the first subset and the second subset may include one photodiode. For example, the processor 210 may designate G1 in the photodiode array 311 as the first subset 601 and may designate G4 as the second subset at the first time when the light source is above the electronic device. At the second time when the electronic device is rotated in the clockwise direction, the processor 210 may designate G4 in the photodiode array 311 as the first subset 601 and may designate G3 as the second subset 602.

Figure 7A:
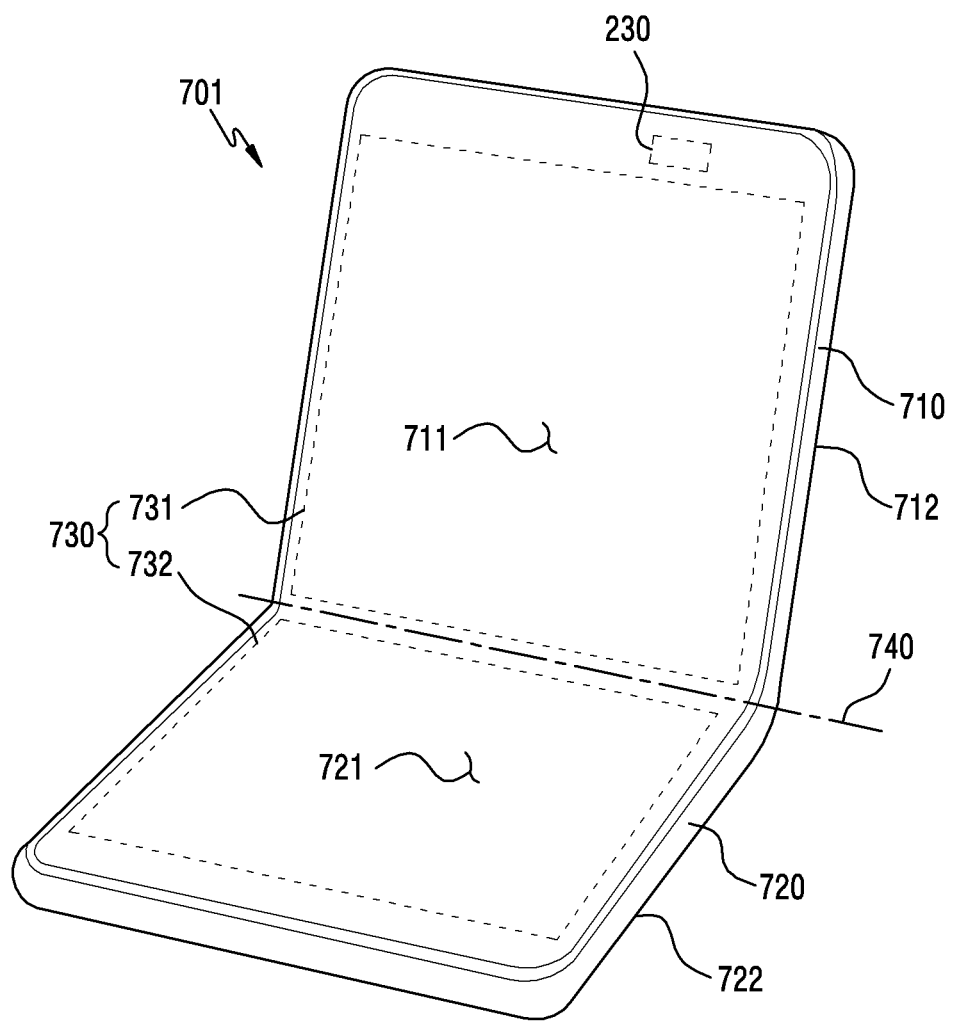
FIG. 7A is a view illustrating an electronic device including a foldable housing according to an embodiment of the disclosure.

FIG. 7A illustrates an electronic device including a foldable housing according to an embodiment of the disclosure.

Figure 7B:
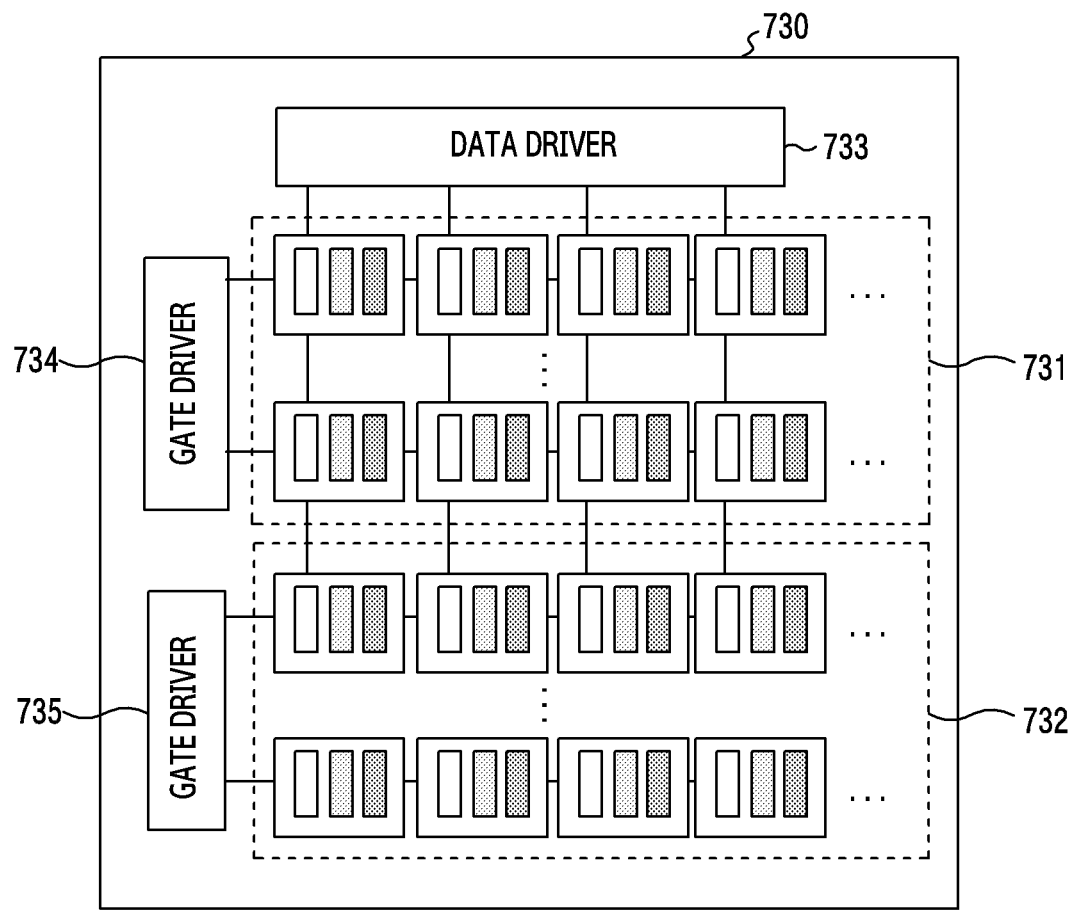
FIG. 7B is a view illustrating a controller of a display of an electronic device of FIG. 7A according to an embodiment of the disclosure.

FIG. 7B illustrates a controller of a display of an electronic device of FIG. 7A according to an embodiment of the disclosure.

Referring to FIG. 7A, an electronic device 701 may include a foldable housing 710, 720, a display 730, a display controller, a processor 210, a photosensor 230.

According to an embodiment of the disclosure, the foldable housing may include a first housing 710 and a second housing 720 which forms an allowed angle with the first housing 710. The first housing 710 may include a first front surface 711 and a first rear surface 712 facing the first front surface 711, and the second housing 720 may include a second front surface 721 and a second rear surface 722 facing the second front surface 721. According to an embodiment of the disclosure, when the electronic device 701 is in a flat state, the first front surface 711 and the second front surface 721 may form the front surface of the electronic device 701, and the first rear surface 712 and the second rear surface 722 may form the rear surface of the electronic device 701. In the following description, a folding angle of the electronic device 701 may refer to an angle that is formed by the first housing 710 and the second housing 70 or an angle that is formed by the first front surface 711 and the second front surface 721.

According to an embodiment of the disclosure, the first housing 710 and the second housing 720 may be connected with each other through an element, such as a hinge (not shown). The first housing 710 and the second housing 720 may be disposed on both sides with reference to a folding axis 740, and the first housing 710 may rotate about the folding axis 740 to form a predetermined angle with the second housing 720. The foldable housing 710, 720 is not limited to the shape shown in FIG. 7A and may be implemented in other shapes.

Referring to FIG. 7A, the display 730 may be disposed on a space formed by the foldable housing 710, 720. The display 730 may include a first portion 731 disposed on one side with reference to the folding axis 740, and a second portion 732 disposed on the other side. The display 730 may be a flexible display that is unfolded or folded according to unfolding or folding of the first housing 710 and the second housing 720. The first portion 731 of the display 730 may be seen from the outside through the first front surface 711 of the electronic device 701, and the second portion 732 of the display 730 may be seen from the outside through the second front surface 721 of the electronic device 701.

According to an embodiment of the disclosure, when the electronic device 701 is in the flat state, the first housing 710 and the second housing 720 may be disposed to face in the same direction while forming the angel of 180 degrees. A surface of the first portion 731 of the display 730 and a surface of the second portion 732 may form 180 degrees with each other and may face in the same direction. When the electronic device 701 is in a folded state, the first housing 710 and the second housing 720 may be disposed to face each other. The surface of the first portion 731 of the display 730 and the surface of the second portion 732 may form a narrow angle (for example, between 0 degree and 10 degrees) with each other. When the electronic device 701 is in an intermediate state, a structure of the first housing 710 and a structure of the second housing 720 may be disposed with a certain angle. The surface of the first portion 731 of the display 730 and the surface of the second portion 732 may form an angle that is larger than in the folded state and is smaller than in the flat state.

Referring to FIG. 7B, the controller of the display 730 may include a data driver 733 and a gate/EM driver (hereinafter, a 'gate driver') 734, 735. The processor 210 may adjust brightness of the flexible display 730 through the gate driver 734, 735, and may control RGB values for respective pixels constituting the display 730 through the data driver 733.

According to an embodiment of the disclosure, the electronic device 701 may include a plurality of gate drivers 734, 735. For example, the electronic device 701 may include a first gate driver 734 electrically connected with the first portion 731 of the display 730, and a second gate driver 735 electrically connected with the second portion 732 of the display 730. The processor 210 may independently control brightness of the first portion 731 and the second portion 732 of the display 730 through the first gate driver 734 and the second gate driver 735.

According to an embodiment of the disclosure, the photosensor 230 may be disposed within the first housing 710. The photosensor 230 may be disposed to face in the same direction as the first portion 731 of the display 730, and may output an illuminance value of the first front surface 711 corresponding to the first portion 731 of the display 730. According to an embodiment of the disclosure, the photosensor 230 may be disposed on a rear surface of the first portion 731 of the display 730 although this is not illustrated. However, a case in which the photosensor 230 is disposed within the second housing 720 is not excluded, and the electronic device 701 may include a first photosensor 230 disposed in the first housing 710 and a second photosensor 230 disposed on the second housing 720. In this case, the second photosensor 230 may be disposed to face in the same direction as the second portion 732 of the display 730.

Figure 8:
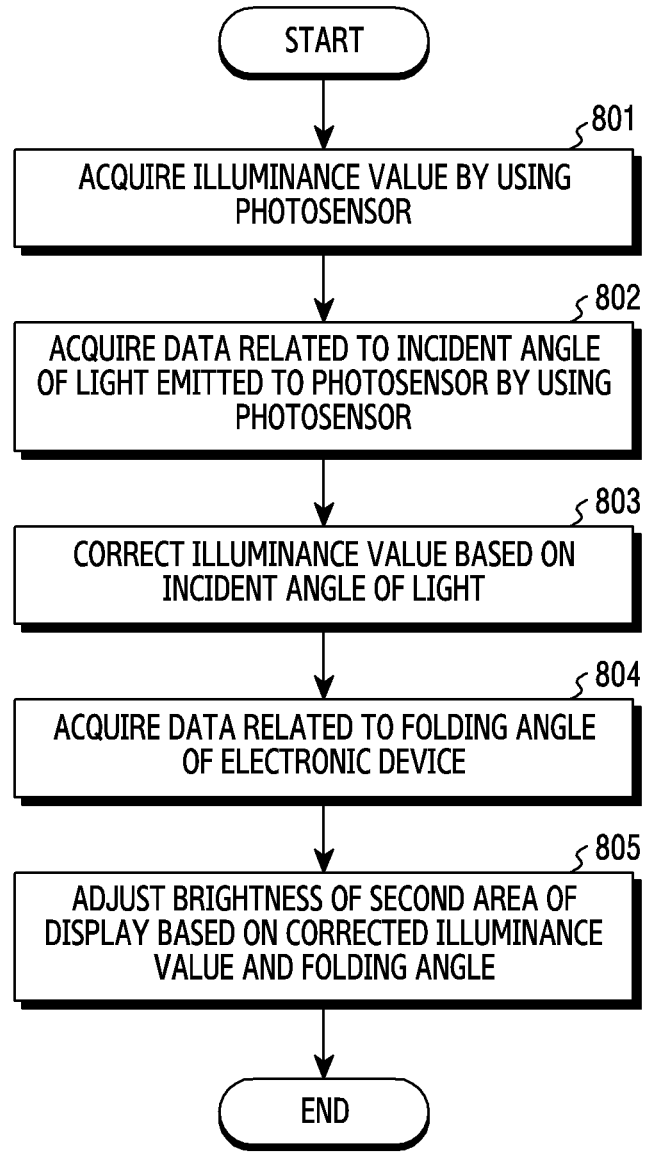
FIG. 8 is a sequence diagram illustrating adjusting brightness of a display in an electronic device according to an embodiment of the disclosure.

FIG. 8 is a sequence diagram illustrating adjusting brightness of a display in an electronic device according to an embodiment of the disclosure.

Referring to FIG. 8, according to an embodiment of the disclosure, the processor 210 may correct an illuminance value of the first front surface 711 of the electronic device 701 through operations 801 to 803. Operations 801 to 803 may correspond to operations 501 to 503 of FIG. 5, and a redundant explanation is omitted.

In operation 804, the processor 210 may acquire data related to a folding angle of the electronic device 701 through at least one sensor (for example, an acceleration sensor, a motion sensor), and in operation 805, may determine brightness of the second portion 732 of the display 730, based on the corrected illuminance value and the folding angle of the electronic device 701.

Specifically, through operations 802 and 804, the processor 210 may acquire data related to an incident angle of light emitted to the first front surface 711 of the electronic device 701 and data related to the folding angle of the electronic device 701, and may acquire an incident angle of light emitted to the second front surface 721 of the electronic device 701, based on the acquired data. For example, when the incident angle of light emitted to the first front surface 711 of the electronic device 701 is α and an angle formed by the first front surface 711 and the second front surface 721 of the electronic device 701, that is, the folding angle, is θ, the incident angle of the light emitted to the second front surface 721 of the electronic device 701 is an angle that is 180 degrees minus α and θ.

The processor 210 may adjust brightness of the second portion 732 of the display 730, based on the corrected illuminance value and the incident angle of light emitted to the second front surface 721. For example, when the electronic device 701 is unfolded and the angle formed by the first housing 710 and the second housing 720 reaches 180 degrees, the processor 210 may adjust brightness of the second portion 732 of the display 730 to be the same as brightness of the first portion 731 of the display 730, by using the corrected illuminance value. In another example, when the electronic device 701 is folded and the first housing 710 and the second housing 720 form a specific angle, the processor 210 may adjust brightness of the second portion 732 of the display 730 to be different from brightness of the first portion 731 of the display 730, by considering the corrected illuminance value and the angle formed by the first housing 710 and the second housing 720.

According to an embodiment of the disclosure, in operation 804, when a change of the folding angle is detected but the posture of the second housing 720 is not changed, the processor 210 may maintain brightness of the second portion 732 of the display 730. For example, when the folding angle is changed but the facing direction of the second front surface 721 of the second housing 720 is not changed, the processor 210 may maintain the same brightness of the second portion 732 of the display 730 as before the folding angle is changed. According to another embodiment of the disclosure, when the facing direction of the second front surface 721 of the second housing 720 is changed with a change of the folding angle, the processor 210 may adjust brightness of the second portion 732 of the display 730, based on the corrected illuminance value which is acquired through the photosensor 230, and the folding angle of the electronic device 701.

According to an embodiment of the disclosure, the electronic device 701 including the first portion 731 and the second portion 732 having different illuminances in the same environment may independently adjust brightness of the display 730 according to each portion, thereby minimizing user's eye fatigue.

In an embodiment of the disclosure, a foldable electronic device (for example, the electronic device 10 of FIG. 2A) may include a foldable housing including: a hinge structure, a first housing structure (for example, the first housing structure 510 of FIG. 2A) connected to the hinge structure and including a first surface and a second surface facing the first surface, and a second housing structure (for example, the second housing structure 520 of FIG. 2A) connected to the hinge structure and including a third surface and a fourth surface facing the third surface, the second housing structure forming an angle of an allowed range with the first housing structure through the hinge structure, a display (for example, the display 200 of FIG. 2A) including a first portion which is viewable through the first surface, and a second portion which is viewable through the third surface and is connected with the first portion, a photosensor (for example, the photosensor 230 of FIG. 2A) disposed inside the foldable housing and including a light receiver (for example, the light receiver 310 of FIG. 3A) configured to measure an intensity of light shining on the electronic device, and a processor operatively connected with the photosensor and the display, and the processor may be configured to acquire an illuminance value by using the photosensor, acquire data related to an incident angle of the light emitted to the electronic device by using the photosensor, correct the illuminance value based on the data related to the incident angle of the light, determine a brightness of the first portion, based on the corrected illuminance value, and determine a brightness of the second portion, based on the illuminance value and an angle formed by the first housing and the second housing.

In an embodiment of the disclosure, the light receiver of the foldable electronic device may include a plurality of photodiodes, and the processor may acquire an intensity of the light shining on a first area by using a first subset which includes at least one photodiode disposed in the first area (for example, the first area 410 of FIG. 4A) of the light receiver among the plurality of photodiodes, by using the photosensor, and may acquire an intensity of the light shining on a second area by using a second subset which includes at least one photodiode disposed in the second area (for example, the second area 420 of FIG. 4A) of the light receiver among the plurality of photodiodes, and may acquire the data related to the incident angle of the light, based on the intensity of the light shining on the first area and the intensity of the light shining on the second area.

In an embodiment of the disclosure, the first area of the foldable electronic device may correspond to one side of the light receiver, and the second area may correspond to the other side of the light receiver.

In an embodiment of the disclosure, the first subset of the foldable electronic device may correspond to one photodiode which is disposed on the one side of the light receiver, and the second subset may correspond to a photodiode disposed on the other side of the light receiver and having the same type as the photodiode.

In an embodiment of the disclosure, the foldable electronic device may further include a motion sensor, and the processor may further be configured to: in response to detecting a posture change of the electronic device by using the motion sensor, change the at least one photodiode constituting the first subset to at least one photodiode disposed in a third area different from the first area, and to change the at least one photodiode constituting the second subset to other photodiodes disposed in a fourth area which is different from the second area.

In an embodiment of the disclosure, the foldable electronic device may further include a motion sensor, and the processor may be configured to acquire data related to the incident angle of the light emitted to the first surface by using the photosensor, in response to detecting a posture change of the electronic device by using the motion sensor.

In addition, the foldable electronic device may further include at least one sensor, and the processor may further be configured to detect a change in an angle between the first housing and the second housing by using the at least one sensor, and, based on detecting the change in the angle, adjust a brightness of the second portion.

In an embodiment of the disclosure, the processor of the foldable electronic device may further be configured to maintain the brightness of the second portion, based on the angle being changed and a facing direction of the second portion being maintained.

In an embodiment of the disclosure, there is provided a control method of a foldable electronic device including a first housing including a first surface and a second surface facing the first surface, a second housing which is foldable with respect to the first housing and includes a third surface and a fourth surface facing the third surface, a display exposed through the first surface and the third surface, and a photosensor disposed within the first housing and including a light receiver configured to measure an intensity of light emitting through the first surface, the control method including acquiring an illuminance value by using the photo sensor, acquiring data related to an incident angle of light emitted to the photosensor by using the photosensor, correcting the illuminance value based on the data related to the incident angle of the light, determining a brightness of a first portion of the display exposed through the first surface of the first housing, based on the corrected illuminance value, and determining a brightness of a second portion exposed through the third surface in the display, based on the illuminance value and an angle formed by the first housing and the second housing.

In an embodiment of the disclosure, in the control method of the foldable electronic device, acquiring the data related to the incident angle of the light shining on the photosensor may include acquiring first data by using a first subset including at least one photodiode among a plurality of photodiodes included in the light receiver, by using the photosensor, and acquiring second data by using a second subset including at least one photodiode among the plurality of photodiodes, and acquiring the data related to the incident angle of the light, based on the first data and the second data.

In an embodiment of the disclosure, in the control method of the foldable electronic device, the first subset may correspond to at least one photodiode disposed on one side of the light receiver, and the second subset may correspond to at least one photodiode disposed on the other side of the light receiver.

In an embodiment of the disclosure, in the control method of the foldable electronic device, the first subset may correspond to one photodiode disposed on one side of the light receiver and including a color filter, and the second subset may correspond to one photodiode disposed on the other side of the light receiver and including a color filter of the same color as the color filter.

In an embodiment of the disclosure, the control method of the foldable electronic device may further include in response to a change in a posture of the electronic device being detected by using an acceleration sensor provided in the foldable electronic device, acquiring third data by using a third subset different from the first subset, and acquiring fourth data by using a fourth subset different from the second subset, and acquiring the data related to the incident angle of the light, based on the third data and the fourth data.

In an embodiment of the disclosure, the control method of the foldable electronic device may further include detecting a change in an angle between the first housing and the second housing, by using at least one sensor provided in the foldable electronic device, and adjusting a brightness of the second portion, based on the change in the angle between the first housing and the second housing being detected.

In an embodiment of the disclosure, the control method of the foldable electronic device may further include maintaining the brightness of the second portion, based on the angle between the first housing and the second housing being changed and a facing direction of the second portion being maintained.

In an embodiment of the disclosure, an electronic device may include a housing including a front surface, a rear surface facing the front surface, and a side surface enclosing a space between the front surface and the rear surface, a display which is viewable through part of the front surface of the housing, a photosensor which is disposed inside the housing and includes a plurality of photodiodes, and is configured to measure an intensity of light shining on the front surface of the housing, and a processor electrically connected with the photosensor and the display, and the processor may be configured to acquire an illuminance value by using the photosensor, to acquire first data from a first subset including at least one photodiode among the plurality of photodiodes, and to acquire second data from a second subset including at least one photodiode different from the first subset among the plurality of photodiodes, while the photosensor is activated, to correct the illuminance value based on the first data and the second data, and to determine a brightness of the display, based on the corrected illuminance value.

In an embodiment of the disclosure, the first subset of the electronic device may correspond to at least one photodiode which is disposed on one side of the light receiver, and the second subset may correspond to at least one photodiode disposed on the other side of the light receiver.

In an embodiment of the disclosure, the first subset of the electronic device may correspond to one photodiode disposed on one side of the light receiver and including a color filter, and the second subset may correspond to one photodiode disposed on the other side of the light receiver and including a color filter of the same color as the color filter.

In an embodiment of the disclosure, the electronic device may further include an acceleration sensor, and the processor may further be configured to acquire third data from a third subset different from the first subset, and to acquire fourth data from a fourth subset different from the second subset, in response to a motion of the electronic device being detected through the acceleration sensor, and to correct the illuminance value based on the third data and the fourth data.

In an embodiment of the disclosure, the electronic device may further include an acceleration sensor, and acquiring the data related to the incident angle of light shining on the photosensor may include acquiring the data related to the incident angle of the light emitted to the first surface, by using the photosensor, in response to a posture change of the electronic device being detected by using the acceleration sensor.

Methods based on the claims or the embodiments disclosed in the disclosure may be implemented in hardware, software, or a combination of both.

Such software may be stored in a computer-readable storage medium. The computer-readable storage medium may store at least one program including instructions that, when being executed by at least one processor 210 in at least one program (software module), the electronic device 701, causes the electronic device 701 to execute the method of the disclosure.

The software may be stored in a volatile storage device or a nonvolatile storage device, such as a read only memory (ROM), a memory, such as a random access memory (RAM), a memory chip, a device or an integrated circuit, or an optical or a magnetic readable medium, such as a compact disc-ROM (CD-ROM), digital versatile discs (DVDs), a magnetic disk or a magnetic tape.

A storage device and a storage medium may be embodiments of a program including instructions for implementing an embodiment when being executed, or machine-readable storage means appropriate for storing programs. Embodiments may provide a program including a code for implementing the apparatus and the method as claimed in any one of claims of the specification, and a machine-readable storage medium storing this program. Furthermore, these programs may be electronically transmitted by a certain medium, such as a communication signal transmitted wired or wireless connection, and embodiments appropriately include equivalents.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A foldable electronic device comprising:
a foldable housing comprising:
  a hinge structure;
  a first housing structure connected to the hinge structure and comprising a first face and a second face opposite to the first face; and
  a second housing structure connected to the hinge structure and comprising a third face and a fourth face opposite to the third face, the second housing structure forming an angle of an allowed range with the first housing structure through the hinge structure;
a display comprising a first portion corresponding to the first face, and a second portion corresponding to the third face and is connected with the first portion;
a photosensor disposed inside the foldable housing and comprising a light receiver configured to measure an intensity of light; and
at least one processor operatively connected with the photosensor and the display, wherein the at least one processor is configured to:
acquire an illuminance value by using the photosensor,
acquire data related to an incident angle of the light emitted to the electronic device by comparing an intensity of light shining on a first area of the light receiver with an intensity of light shining on a second area of the light receiver,
correct the illuminance value based on the data related to the incident angle of the light,
determine a brightness of the first portion, based on the corrected illuminance value, and
determine a brightness of the second portion, based on the corrected illuminance value and an angle formed by the first housing and the second housing.

2. The foldable electronic device of claim 1, wherein the light receiver comprises a plurality of photodiodes, and wherein the at least one processor is further configured to:
acquire the intensity of the light shining on the first area by using a first subset which comprises at least one photodiode disposed in the first area of the light receiver among the plurality of photodiodes, by using the photosensor,
acquire an intensity of the light shining on the second area by using a second subset which comprises at least one photodiode disposed in the second area of the light receiver among the plurality of photodiodes, and
acquire the data related to the incident angle of the light, based on the intensity of the light shining on the first area and the intensity of the light shining on the second area.

3. The foldable electronic device of claim 2,
wherein the first area corresponds to one side of the light receiver, and
wherein the second area corresponds to the other side of the light receiver.

4. The foldable electronic device of claim 3,
wherein the first subset corresponds to one photodiode which is disposed on the one side of the light receiver, and
wherein the second subset correspond to a photodiode disposed on the other side of the light receiver and having the same type as the photodiode.

5. The foldable electronic device of claim 2, further comprising a motion sensor,
wherein the at least one processor is further configured to:
in response to detecting a posture change of the electronic device by using the motion sensor, change the at least one photodiode constituting the first subset to at least one photodiode disposed in a third area different from the first area, and to change the at least one photodiode constituting the second subset to other photodiodes disposed in a fourth area which is different from the second area.

6. The foldable electronic device of claim 1, further comprising a motion sensor,
wherein the at least one processor is further configured to acquire data related to the incident angle of the light emitted to the first face by using the photosensor, in response to detecting a posture change of the electronic device by using the motion sensor.

7. The foldable electronic device of claim 1, further comprising at least one sensor,
wherein the at least one processor is further configured to:
detect a change in an angle between the first housing and the second housing by using the at least one sensor, and based on detecting the change in the angle, adjust a brightness of the second portion.

8. The foldable electronic device of claim 7, wherein the at least one processor is further configured to maintain the brightness of the second portion, based on the angle being changed and a facing direction of the second portion being maintained.

9. A method of controlling a foldable electronic device, the method comprising:
acquiring an illuminance value by using a photosensor;
acquiring data related to an incident angle of light emitted to the photosensor by comparing an intensity of light shining on a first area of the photosensor with an intensity of light shining on a second area of the photosensor;
correcting the illuminance value based on the data related to the incident angle of the light;
determining a brightness of a first portion of a display exposed through a first face of a first housing, based on the corrected illuminance value; and
determining a brightness of a second portion exposed through a third face in the display, based on the corrected illuminance value and an angle formed by the first housing and a second housing,
wherein the photosensor is disposed within the first housing and comprises a light receiver configured to measure an intensity of light emitting through the first face,
wherein the first housing includes the first face and a second face opposite to the first face,
wherein the second housing is foldable with respect to the first housing and comprises the third face and a fourth face opposite to the third face, and
wherein the display is exposed through the first face and the third face.

10. The method of claim 9, wherein the acquiring of the data related to the incident angle of the light shining on the photosensor comprises:
acquiring first data by using a first subset comprising at least one photodiode among a plurality of photodiodes included in the light receiver, by using the photosensor, and acquiring second data by using a second subset comprising at least one photodiode among the plurality of photodiodes; and
acquiring the data related to the incident angle of the light, based on the first data and the second data.

11. The method of claim 10,
wherein the first subset corresponds to at least one photodiode disposed on one side of the light receiver, and
wherein the second subset corresponds to at least one photodiode disposed on the other side of the light receiver.

12. The method of claim 11,
wherein the first subset corresponds to one photodiode disposed on one side of the light receiver and comprising a color filter, and
wherein the second subset corresponds to one photodiode disposed on the other side of the light receiver and comprising a color filter of the same color as the color filter.

13. The method of claim 10, further comprising:
in response to a change in a posture of the electronic device being detected by using an acceleration sensor provided in the foldable electronic device, acquiring third data by using a third subset different from the first subset, and acquiring fourth data by using a fourth subset different from the second subset; and acquiring the data related to the incident angle of the light, based on the third data and the fourth data.

14. The method of claim 9, further comprising:
detecting a change in an angle between the first housing and the second housing, by using at least one sensor provided in the foldable electronic device; and
adjusting a brightness of the second portion, based on the change in the angle between the first housing and the second housing being detected.

15. The method of claim 14, further comprising maintaining the brightness of the second portion, based on the angle between the first housing and the second housing being changed and a facing direction of the second portion being maintained.

16. An electronic device comprising:
a housing;
a display;
a photosensor disposed inside the housing and comprising a light receiver configured to measure an intensity of light shining on the electronic device; and
at least one processor operatively connected with the photosensor,
wherein the light receiver comprises a plurality of photodiodes
wherein the at least one processor is configured to:
acquire an illuminance value by using the photosensor,
acquire data related to an incident angle of the light emitted to the electronic device by comparing an intensity of light shining on a first area of the light receiver with an intensity of light shining on a second area of the light receiver,
correct the illuminance value based on the data related to the incident angle of the light, and
determine a brightness of the display, based on the corrected illuminance value.

17. The electronic device of claim 16,
wherein the light receiver comprises a plurality of photodiodes, and
wherein the at least one processor is further configured to:
acquire the intensity of the light shining on the first area by using a first subset which comprises at least one photodiode disposed in the first area of the light receiver among the plurality of photodiodes, by using the photosensor,
acquire an intensity of the light shining on the second area by using a second subset which comprises at least one photodiode disposed in the second area of the light receiver among the plurality of photodiodes, and
acquire the data related to the incident angle of the light, based on the intensity of the light shining on the first area and the intensity of the light shining on the second area.

18. The electronic device of claim 17,
wherein the first area corresponds to one side of the light receiver, and
wherein the second area corresponds to the other side of the light receiver.

19. The electronic device of claim 18,
wherein the first subset corresponds to one photodiode which is disposed on the one side of the light receiver, and
wherein the second subset correspond to a photodiode disposed on the other side of the light receiver and having the same type as the photodiode.

20. The electronic device of claim 17, further comprising:
a motion sensor,
wherein the at least one processor is further configured to:
in response to detecting a posture change of the electronic device by using the motion sensor, change the at least one photodiode constituting the first subset to at least one photodiode disposed in a third area different from the first area, and to change the at least one photodiode constituting the second subset to other photodiodes disposed in a fourth area which is different from the second area.

* * * * *